United States Patent
Grønvik et al.

(10) Patent No.: US 11,606,362 B2
(45) Date of Patent: Mar. 14, 2023

(54) PRIVACY-PRESERVING COMPOSITE VIEWS OF COMPUTER RESOURCES IN COMMUNICATION GROUPS

(71) Applicant: MICROSOFT TECHNOLOGY LICENSING, LLC, Redmond, WA (US)

(72) Inventors: Johan Grønvik, Tromsø (NO); Jan-Ove Karlberg, Tromsø (NO); Håkon Bergland Brugård, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 16/884,614

(22) Filed: May 27, 2020

(65) Prior Publication Data

US 2021/0377275 A1 Dec. 2, 2021

(51) Int. Cl.
    *H04L 9/40* (2022.01)
(52) U.S. Cl.
    CPC .......... *H04L 63/104* (2013.01); *H04L 63/101* (2013.01); *H04L 63/102* (2013.01)
(58) Field of Classification Search
    CPC ... H04L 63/104; H04L 63/101; H04L 63/102; H04L 51/16; G06Q 10/10; G06Q 10/101; G06Q 10/103
    See application file for complete search history.

(56) References Cited

U.S. PATENT DOCUMENTS

| 8,601,549 | B2* | 12/2013 | Dickerson | G06F 21/6218 726/4 |
| 10,740,838 | B2* | 8/2020 | Daly, Jr. | G06F 16/93 |
| 11,122,109 | B2* | 9/2021 | Sun | G06F 16/9558 |
| 2005/0010639 | A1* | 1/2005 | Long | G06Q 10/10 709/204 |
| 2007/0150551 | A1* | 6/2007 | Krishnan | G06Q 10/10 709/218 |
| 2008/0313703 | A1* | 12/2008 | Flaks | H04L 63/101 726/2 |
| 2014/0189808 | A1* | 7/2014 | Mahaffey | H04L 63/083 726/4 |
| 2015/0100503 | A1* | 4/2015 | Lobo | G06Q 10/103 705/301 |

(Continued)

OTHER PUBLICATIONS

Gasser, M., Goldstein, A., Kaufman, C., & Lampson, B. (1989). The Digital distributed system security architecture. (Year: 1989).*

(Continued)

*Primary Examiner* — Jung W Kim
*Assistant Examiner* — Sameera Wickramasuriya
(74) *Attorney, Agent, or Firm* — Holzer Patel Drennan

(57) ABSTRACT

Computerized systems are provided for detecting or receiving a sharing gesture in a communication group and responsively instantiating or updating one or more computer objects that include rich contextual data associated with the sharing gesture. These computer objects can be instantiated or updated based on one or more rules or policies. These computer objects or associated indications can be surfaced back to a user to give the user context regarding the shared resource. It can be determined whether a user has access to (or permission to access) such a computer object and/or an associated computer resource for presentation to the user.

20 Claims, 10 Drawing Sheets

(56) References Cited

U.S. PATENT DOCUMENTS

| | | | |
|---|---|---|---|
| 2015/0120577 A1* | 4/2015 | Lobo | G06Q 10/103 |
| | | | 705/301 |
| 2018/0167399 A1* | 6/2018 | Vas | H04L 63/101 |
| 2018/0191706 A1* | 7/2018 | Hobson | G06F 9/50 |
| 2020/0142750 A1* | 5/2020 | Kaplan | H04L 67/06 |
| 2020/0344212 A1* | 10/2020 | Devireddy | H04L 63/0236 |

OTHER PUBLICATIONS

E. Demidova et al., "Services for Knowledge Resource Sharing & Management in an Open Source Infrastructure for Lifelong Competence Development," Seventh IEEE International Conference on Advanced Learning Technologies (ICALT 2007), 2007, pp. 691-693, doi: 10.1109/ICALT.2007.223. (Year: 2007).*

"International Search Report and Written Opinion Issued in PCT Application No. PCT/US21/023056", dated Jun. 22, 2021, 12 Pages.

* cited by examiner

PRIVACY-PRESERVING COMPOSITE VIEWS OF COMPUTER RESOURCES IN COMMUNICATION GROUPS

BACKGROUND

Computer-implemented technologies can assist users to formulate communication groups, and in particular, exchange computer resources (e.g., web links, documents, files, and the like) within such communication groups. For example, some group chat applications are configured to upload and store, in computer memory, a spreadsheet document so that members of the group can access the spreadsheet document. However, existing technologies do not provide functionality for intelligently presenting rich contextual data (e.g., the exact names of members of a group at the time a resource was shared) in light of access control requirements, among other things. Further, the stored information and the user interface functionality of these technologies are also limited. Advances in computing technology and the increased prevalence of modern computing devices have resulted in a dramatic increase in data available regarding communication groups. But the conventional solutions have not kept pace with these advances and have failed to capitalize on the available data, or provide robust functionality in order to address these new challenges. Moreover, existing technologies unnecessarily consume computing resources, such as memory, CPU, and network resources, among other things.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of this disclosure relate to computerized systems for detecting or receiving a sharing gesture (e.g., a reference to a computer resource, such as link to a computer file shared by one user to other users) in a communication group and responsively generating or updating one or more computer objects (e.g., data structures, function, data object, and/or a value) that include rich contextual data associated with the sharing gesture. These computer objects (or indications of the computer objects) can be surfaced back to a user to give the user context regarding the shared resource. For example, a group participant of an online meeting session may post a thread indicative of a sharing gesture that states, "here is the link to the web page I was talking about." Various contextual information, such as the names of the group members that existed when the sharing gesture occurred, the type of computer resource, a timestamp of the sharing gesture, or other contextual information can be populated in or used to update a computer object, which can then be surfaced back to a user, who may have been another participant in the meeting, or someone who was unable to attend the meeting, for example.

Some embodiments additionally instantiate or update these computer objects based on one or more rules or policies that dictate how much of a computer resource is populated in the computer object (or surfaced to a user) and/or what (or how much) contextual data is populated in the computer object (or surfaced to a user) depending on various criteria. For example, embodiments can determine the type of group that the sharing gesture occurred within and locate, in memory, a rule that indicates that if a group is a certain type of group, then certain types of contextual data, a certain amount of contextual data, or a specific contextual data set should be extracted and populated in the computer object.

Some embodiments additionally or alternatively determine whether a user of a communication group has access to (or permission to access) such a computer object and an associated computer resource for presentation to the user. In some instances, not all members of a communication group may have access to a given resource that is shared within the group, even though a request to share the computer resource has been made. This may be due to different access control rules implemented for a particular computer resource irrespective of the communication groups that the computer resource was shared within. Particular embodiments compare the requesting user's access credentials with a group access control list ("ACL") needed to access the computer object and/or an ACL needed to access the computer resource itself. In various embodiments, the group ACL needed to access the one or more computer objects is different than the ACL needed to access the corresponding resources shared in a sharing gesture and thus may require respective access control checks for both. This may be due to users being members of a particular group but not having access to the all of the resources shared within the group. Alternatively, users may have access to the resources that are shared, but they may not be part of a particular group. In particular embodiments, even if the user does not have access to the payload or content of a particular computer resource, the user may still gain access to the computer object, which provides an indication that a computer resource was shared based on presented contextual data about the resource.

BRIEF DESCRIPTION OF THE DRAWINGS

Aspects of the disclosure are described in detail below with reference to the attached drawing figures, wherein.

DETAILED DESCRIPTION

Figure 1:
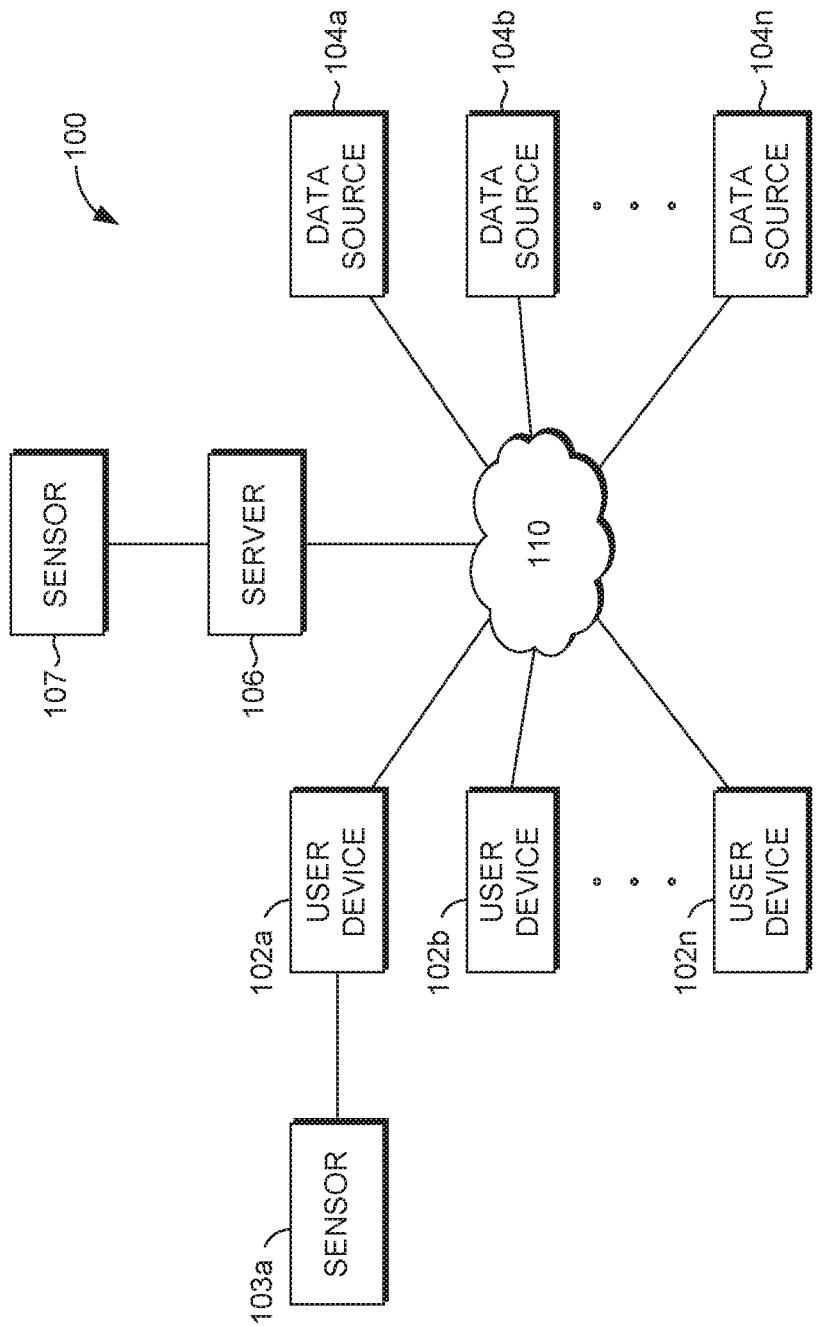
FIG. 1 is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Computer resource (e.g., file) sharing functionality in communication group technologies (e.g., MICROSOFT TEAMS®) is often incomplete in that it lacks important contextual data needed to understand or identify the context surrounding the computer resource (e.g., exactly what the computer resource contains). Accordingly, a user may see that a computer resource was shared in a group but may not be able to determine what the computer resource contains or any other contextual data about the computer resource. Communication groups can include threads, posts, or messages between group members that become very long transcripts of data over time. Accordingly, it can be arduous for users to drill down, scroll through, or otherwise find any context within such messages as it relates to such computer resources. Further, even the messages themselves within communication group applications often do not include enough contextual data surrounding a computer resource.

Various aspects of the present disclosure make up these deficiencies and improve existing technologies by performing new functionality. For example, particular embodiments generate or update computer objects (also referred to herein as "composite views") that include rich contextual data. A "computer object" as described herein is a variable, data structure, function, data object, and/or value that can be accessed or referenced in computer memory that includes metadata or contextual data associated with a sharing gesture. A "sharing gesture" as described herein includes a reference (e.g., a URL) to one or more computer resources. The computer resource may be a web resource (e.g., a web page or web application), a locally (or remotely) stored application, document (e.g., a MICROSOFT WORD document), file, or like that is not part of an application that hosts a communication group. A sharing gesture typically is or is a part of a message, thread, or post sent by a group member. For example, the message may state, "here is the file we talked about yesterday," where "file" is the sharing gesture and hyperlink to the computer resource—the actual file. Another example of a sharing gesture is a link to an article on the web, where the computer resource is the web article.

"Contextual data" in some embodiments may represent event context. "Event context" can include some or all of the dialogue or utterances leading up to and/or after a sharing gesture has been shared in a communication group application. In an illustrative example, for the sharing gesture " . . . here is the link for last quarter," the sentence right before this phrase in a chat session may have been, "Robert, do you have the link for last quarter sales for department A?" This contextual data provides useful context, such as the fact that the link contains department A sales for last quarter. Using this same illustration, a sentence directly after the sharing gesture in the chat session may be, "please disregard any sales information from other sales groups." This contextual data may be useful for determining that other sales group information is not useful for this chat session. Subsequently, in some embodiments, a user interface or other graphically displayed format may display metadata indicating that this particular resource contains department A sales data for last quarter and only displays department A sales data, as opposed to other data in the resource based on the event context.

Additionally or alternatively, contextual data can refer to any remote or external context obtained, which is not directly part of the transcripts, content, or messages (e.g., the event context) within the communication group application. For example, external context can be data retrieved from a user device (e.g., via a calendaring tool plugin, text, social media, or other application), sensor (e.g., biometric sensor, geolocation sensor), one or more servers, and/or other remote data stores, such as a database. Such external context can be used as one or more signals to determine information such as other important details or metadata associated with the sharing gesture or computer resource. In an illustration, using the example above, for a group communication session that includes the sharing gesture " . . . here is the link for last quarter," the event context may still not indicate other useful information, such as an updated version of the computer resource shared via email or other communication channels (e.g., SMS text) to the members of the group, instead of via the communication group application. In these situations, embodiments can obtain this contextual data from sources outside of the communication group application and provide, in a computer object or user interface of the communication group application, the updated computer resource and/or updated metadata of the updated computer resource.

Various embodiments improve existing technology by instantiating or updating these computer objects based on one or more rules or policies that dictate how much of a computer resource is populated in the computer object (or surfaced to a user) and/or what (or how much) contextual data is populated in the computer object (or surfaced to a user) depending on various criteria. For example, a rule may specify what to include in the computer object based on the specific type of computer resource (e.g., WORD document, EXCEL spreadsheet, or external internet web link) being shared in a sharing gesture. In another example, another rule may specific to share a single property (e.g., column in an EXCEL document) of a resource if the event context indicates that other properties of the computer resource are not needed.

Particular embodiments additionally or alternatively determine whether a user has access to such computer object and an associated computer resource. Complicating matters for communication groups in existing technologies is that not all members of a group have access to a given resource shared in the group even though a request to share the resource has been made. For example, there may be different access control rules implemented for a resource irrespective of communication groups in which the resource was shared. Often different types of people in an organization are permitted to access different levels of information, based on their role, qualifications, or other criteria. Access-controlled data may be rendered to certain permitted users through the use of access-control management functionality. Access-control management refers to a technology infrastructure that help users, groups, or enterprises restrict access of particular resources (e.g., files, applications, documents, changes in network settings, and the like) through policies indicating who or what has specific privileges to such resources. Particular individuals or processes are "privileged" because they have the authority to make administrative changes or have other access rights (e.g., a read-only view privilege) to a resource, while others do not have such rights. For example, access-control management functionality can include restricting access of a particular application to a few select individuals (e.g., an administrator and a Chief Financial Officer) based on the individuals' company role irrespective of the communication group.

Existing technologies do not give access to those group members not having access to such resources but also do not otherwise apprise or notify the user that a resource has been shared or present other contextual data. Accordingly, various embodiments of the present disclosure additionally or alternatively improve these technologies by intelligently returning the computer object and/or the computer resource based on the user's access credentials. Particular embodiments compare the requesting user's access credentials with an access control list (ACL) needed to access the computer object and computer resource itself. An ACL indicates one or more particular access control levels needed to access a corresponding resource or computer object. Each ACL can specify an individual (e.g., a name of a person), user (e.g., a particular service or end user), or security group(s) whose members have access to the resources or computer objects, required labels, information barriers, and the like. Each ACL includes one or more access control level identifiers corresponding to one or more access control levels.

In an example illustration, in order to access a first computer resource, the ACL may indicate "[Jane Doe; John Doe]," where "Jane Doe" is a first access control level identifier and "John Doe" is a second access control level identifier. This ACL may indicate that in order to access the first resource, the requesting user must need to be Jane Doe or John Doe. In this way, when a user requests access to the computer resource, some embodiments efficiently return only properties of the computer resource that the user has access to by comparing the user's access credentials with the one or more access control level identifiers.

Some embodiments described herein use a group ACL that is generally used for determining whether the requesting user has access to one or more computer objects based on comparing the user's access credentials to one or more group ACLs needed to access the one or more computer objects. In some embodiments, a group ACL is an ACL corresponding to a group membership requirement needed for access to a computer object containing contextual data of a resource. In various embodiments, the group ACL needed to access the one or more computer objects is different than the ACL needed to access the corresponding resources shared in a sharing gesture or requires respective checks for both. For instance, users may be members of a particular group but do not have access to the resources they share. Alternatively, users may have access to a particular computer resource but they may not be part of a particular group. In these situations, existing technologies lack the functionality for determining exactly what is surfaced back to the user of a group because of these seemingly conflicting access control requirements.

Various embodiments associate computer objects with a group access control level needed to access the computer object such that any user that does not meet the group access control level is not a member of the group and/or is prevented from accessing the computer object. For example, in order to access a first computer object, the ACL may indicate "[security group A; security group B]," where "security group A" is a first access control level identifier and "security group B" is a second access control level identifier. This ACL may indicate that in order to access the first computer object, the requesting user must be a member of "security group A" (e.g., a first MICROSOFT TEAMS channel) and/or "security group B" (e.g., a second MICROSOFT TEAMS channel). In this way, when a user requests access to the computer object or computer resource, some embodiments efficiently return only information that the user has access to by comparing the user's access credentials with the one or more access control level identifiers. Accordingly, for example, even if the user does not have access to the payload of a particular computer resource, the user may still gain access to the computer object, which provides an indication or hint that a computer resource was shared and some contextual data about the resource.

In some embodiments, an intelligent graphical user interface may be provided that includes functionality to improve the user experience. Existing applications or user interface technologies are particularly deficient in terms of their functionality. Conventional communication group solutions, such as chatrooms or user interfaces of meeting applications simply display all of the text of an entire chat history that is inputted by users along with the corresponding resources shared. This forces the tedious user task of manually scrolling through threads or windows to see what computer resources (or context) exists or drilling through various layers to obtain any relevant information. This also forces users to determine missing information, such as the type of resource shared, when the resource was shared, and the like. This can cause inaccuracies because of human error and the extensive time needed to make this determination. Various embodiments of the present disclosure improve these technologies because they can, for example, display a condensed list, application programming interface (API), or container of computer resources and a relatively small amount of contextual data (as opposed to an entire chat history transcript) via a single user interface. In this way, embodiments provide a type of summary of computer resources and associated contextual data without requiring users to drill down, scroll, or otherwise sort through a lot of data within chat histories.

Existing technologies are also inefficient in terms of computing resource consumption (e.g., CPU, memory, I/O, network latency). For example, existing technologies require entire transcripts of chat histories to be either transmitted over a network to a user device and presented to a user interface or stored to memory devices so that the user can manually parse out the relevant information within the data. Such transcripts may include input, such as the names of group participants, the time of posts, the name of the group, each avatar of each participant, and all of the group chat history content. This can increase storage device I/O (e.g., excess physical read/write head movements on non-volatile disk) or network latency because each time a user inputs these data, requests have to repetitively reach out to the storage device to perform read/write operations, which is time consuming, error prone, and can eventually wear on components, such as a read/write head. Additionally, with session or network-based web applications, each user input may require packet generation costs (e.g., input header information) for network protocols (e.g., TCP/IP), which may increase network latency each time the user input is transmitted over a network. For instance, each time a user clicks on a web link of a computer resource, packet headers have to be exchanged and the payload of the data has to traverse the network. Additionally, presenting user interfaces, storing, or transmitting entire transcripts of events can consume an unnecessary amount of memory.

Various embodiments of the present disclosure improve these technologies by improving computing resource consumption of computing devices. For example, some aspects only present, transmit, or store computer resources shared in a sharing gesture (and perhaps a relatively small quantity of metadata and/or contextual data). For example, after determining sharing gestures, embodiments can transmit only the computer objects that contain a portion or indication (e.g., filename, identifier identifying the computer resource, location of the computer resource pathway of computer resource) of the computer resource and metadata (as opposed to the entire meeting transcript), over a computer network. In this way, packet generation costs are reduced because only computer objects are transmitted over a network, which in some cases allows more bits to be transmitted over the network. In another example, only a portion of a resource and metadata is stored to or retrieved from memory, as opposed to entire transcripts of a meeting. In this way, memory storage is optimized and there are fewer I/O operations. In another example, one or more portions of the actual payload or content of a computer resource can be directly presented to a user interface. In this way, a user may get relevant information about a computer resource without needing to click on a link. As stated above, using TCP/IP or other network protocols, there are packet generation costs when a link is selected. Accordingly, when one or more portions of a computer resource are directly provided to a user interface, the payload of the computer resource need not be fetched remotely, for example, such that there are no packet generation costs.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 1100 described in connection to FIG. 11, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 10 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
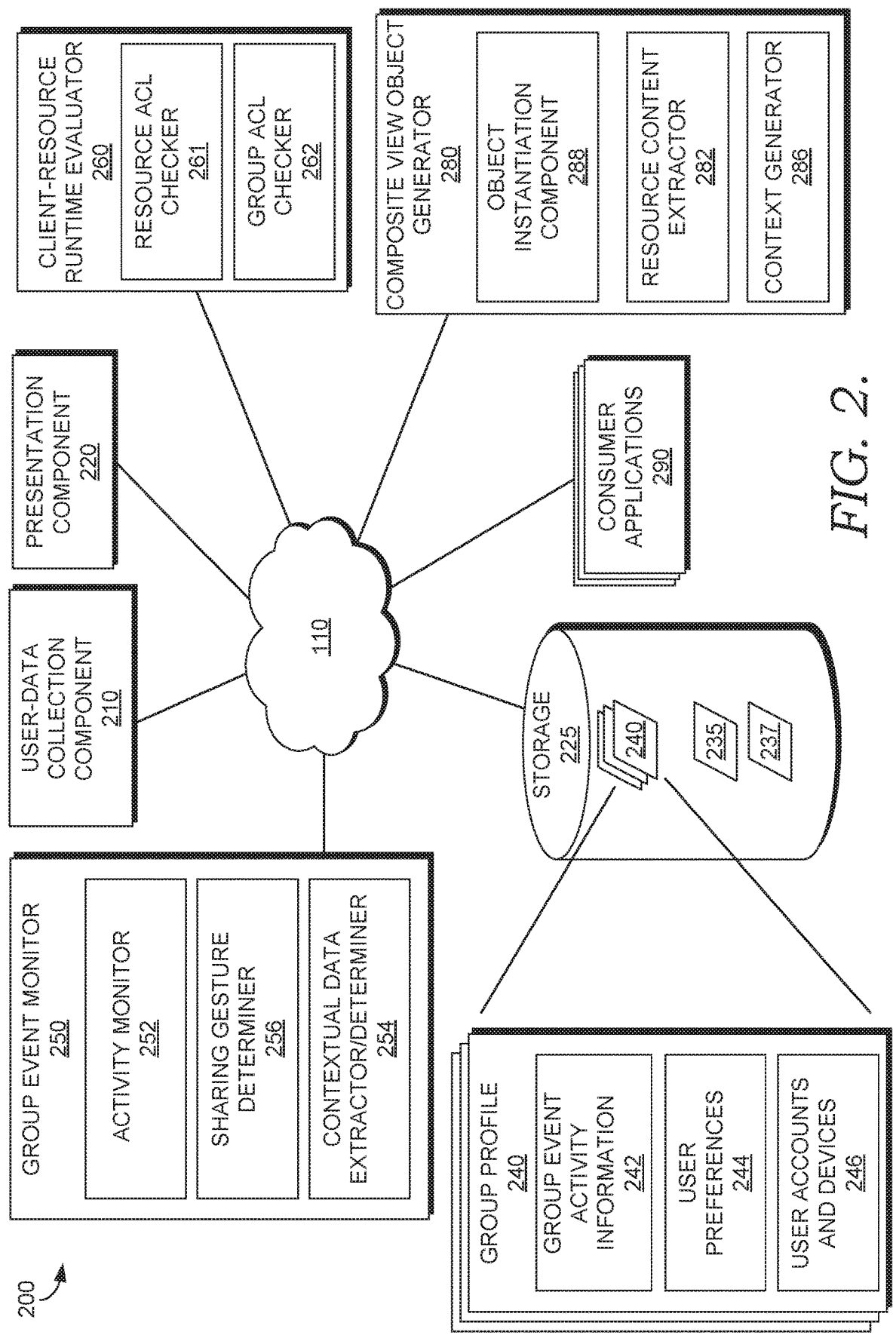
FIG. 2 is a block diagram illustrating an example system architecture for generating or updating a computer object and determining whether a user has access to such computer object and the associated computer resource, in accordance with embodiments of the present disclosure.

Operating environment 100 can be utilized to implement one or more of the components of the system 200, described in FIG. 2, including components for generating or updating composite views or data objects. Operating environment 100 also can be utilized for implementing aspects of process flow 700, 800, and/or 900 as described with respect to FIGS. 7, 8, and 9 respectively. Referring now to FIG. 2, with FIG. 1, a block diagram is provided showing aspects of an example computing system architecture suitable for implementing an embodiment of the disclosure and designated generally as composite view generation system 200. The composite view generation system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including the group profile 240, the group event monitor 250, the user-data collection component 210, the presentation component 220, the composite view object generator 280, the client-resource runtime evaluation 260, and storage 225. The composite view generation system 200 is generally responsible for generating a computer object and determining whether a user has access to such computer object and the associated computer resource. In some embodiments system 200 may include or operate with one or more consumer applications 290. These components may be embodied as a set of compiled computer instructions or functions, program modules, computer software services, or an arrangement of processes carried out on one or more computer systems, such as computing device 1000 described in connection to FIG. 10 for example.

In one embodiment, the functions performed by components of system 200 are associated with one or more personal assistant applications, services, plugins, extensions, or routines. In particular, such applications, services, plugins, extensions, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user or group (or in some cases, a plurality of users including crowdsourced data) for the group event monitor 250 and/or the group profile 240. The data may be received (or accessed), and optionally accumulated, reformatted, and/or combined, by user-data collection component 210 and stored in one or more data stores such as storage 225, where it may be available to other components of system 200. For example, the user data may be stored in or associated with the group profile 240, as described herein. In some embodiments, any personally identifying data (i.e., user data that specifically identifies particular users) is either not uploaded or otherwise provided from the one or more data sources with user data, is not permanently stored, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

User data can be received by user-data collection component 210 from one or more sensors and/or computing devices associated with a user or users of a group. While it is contemplated that the user data may be processed, for example by the sensors or other components not shown, for interpretability by user-data collection component 210, embodiments described herein do not limit the user data to processed data and may include raw data. In some embodiments, user-data collection component 210 or other components of system 200 may determine interpretive data from received user data. Interpretive data corresponds to data utilized by the components of system 200 to interpret user data. For example, interpretive data can be used to provide context to user data, which can support determinations or inferences made by the components or subcomponents of system 200, such as venue information from a location, a text corpus from user speech (i.e., speech-to-text), or aspects of spoken language understanding. Moreover, it is contemplated that for some embodiments, the components or subcomponents of system 200 may use user data and/or user data in combination with interpretive data for carrying out the objectives of the subcomponents described herein.

In some respects, user data may be provided in user-data streams or signals. A "user signal" can be a feed or stream of user data from a corresponding data source. For instance, a user signal could be from a smartphone, a home-sensor device, a smart speaker, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed.

Continuing with FIG. 2, example system 200 includes a group event monitor 250. Group event monitor 250 is generally responsible for determining and/or detecting online and/or in-person events (e.g., group creation or messages within a group) and features from the events making the features available to the other components of the system 200. For instance, the group event monitor 250 can receive an indication that a computerized group container has been formed. A "computerized group container" as described herein is a container that is configured to store one or more electronic messages exchanged between a plurality of participants of a group. Many cloud scale services are built on top of data layers which scale horizontally by spreading data across management units, known as shards. Each management unit controls a subset of a total data corpus. When a group is formed, a group shard is created corresponding to the computerized group container or communication group. For example, a computerized group container or communication group may be a MICROSOFT TEAMS® channel or group, a MICROSOFT SHAREPOINT® group, a MICROSOFT YAMMER® group, a social network of friends or acquaintances (e.g., FACEBOOK), a chat group, or any suitable container where users can share and access messages, threads, and/or posts. Accordingly, the group event monitor 250 can receive an indication that a group has been formed based on a user request to create such group or messages within an already-created group have been input based on receiving indications of the messages. In some aspects, group event monitor 250 determines and provides a set of features (such as described below), for a particular event, and for each user associated with the group. In some aspects, the event may be a past (or historic) event or a current event.

In some embodiments, the input into the group event monitor 250 is sensor data, user device data of one or more users engaging in an event and/or contextual data from a meeting invite, email, chat for the group, or any historic messages sent within the group. In some embodiments, this includes user data collected by the user-data collection component 210 (which can be accessible via the group profile 240).

The activity monitor 252 monitors user activity via one or more sensors, (e.g., microphones, video), devices, chats, presented content, and the like. In some embodiments, the activity monitor 252 outputs transcripts or activity that happens during a meeting or discussion within the group. For example, activity or content may be timestamped or otherwise correlated with meeting transcripts. In an illustrative example, the activity monitor 252 may indicate a clock time at which a session for a chat for a group begins and ends. In some embodiments, the activity monitor 252 monitors user activity information from multiple user devices associated with the user and/or from cloud-based services associated with the user (such as email, calendars, social media, or similar information sources), and which may include contextual data associated with transcripts or content of an event. For example, an email may detail conversations between two participants of a group that provide context to a computer object by describing details of the meetings, such as the topic of the meeting for a particular chat session within the group. A The activity monitor 252 may determine current or near-real-time user activity information and may also determine historical user activity information, in some embodiments, which may be determined based on gathering observations of user activity over time, accessing user logs of past activity (such as browsing history, for example). Further, in some embodiments, the activity monitor 252 may determine user activity (which may include historical activity) from other similar users (i.e., crowdsourcing).

In some embodiments, using contextual data related to user devices, a user device may be identified by the activity monitor 252 by detecting and analyzing characteristics of the user device, such as device hardware, software such as OS, network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a group profile associated with the group, such as in the group profile 240. In an embodiment, the user devices may be polled, interrogated, or otherwise analyzed to determine contextual data about the devices. This information may be used for determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

The sharing gesture determiner 256 is generally responsible for detecting one or more sharing gestures that occur in a group event or computerized group container. A "sharing gesture" as described herein includes a reference (e.g., a link or URL) to one or more computer resources (e.g., file) (e.g., the computer resource(s) 235 in the storage 225). A "computer resource" or "resource" as described herein is any set of data that is stored to or accessible outside of the computerized group container (or group event) or application that hosts the computerized group container (or group event). For example, the computer resource may be a web resource (e.g., a web page or web application) accessible over the internet and/or a locally (or remotely) stored application, document (e.g., a MICROSOFT WORD document), file, and the like that is not part of an application that hosts the group event or computerized group container. A sharing gesture typically is or is a part of a message sent by a participant within a group or computerized group container. For example, the message may state, "here is the file we talked about yesterday," where "file" is the sharing gesture and hyperlink to the actual file. Another example of a sharing gesture is a link to an article on the web, where the computer resource is the web article. Likewise, if a user shares a link to a WORD document, this is a sharing gesture where the computer resource is the WORD document.

The sharing gesture determiner 256 detects sharing gestures in any suitable manner. For example, in some embodiments, a URL can be detected in a string or link using "regular expression" (known as "regex") or other text matching algorithm that recognizes URLs. Alternatively or additionally, natural language processing (NLP) functionality can be used within message to detect sharing gestures. For example, a NLP module breaks or tokenizes character sequences (e.g., messages) from the group event joins or concatenates other character sequences (e.g., semantically similar words) and/or tags (e.g., part-of-speech) to the tokenized character sequences. In this way, messages may be parsed into its words and some or each of the words are tagged with a part-of-speech identifier.

"Tokenization" or parsing in various embodiments corresponds to a computer-implemented process that segments the content into words, sentences, symbols, character sequence, and/or other elements of the content. "Syntax" or syntactic properties refers to the structure of character sequences of the content (as opposed to the semantics or meaning), such as the structure of a sentence. This can include a set of rules for analyzing a message, such as word and/or POS order.

In some embodiments, NLP derives semantic and syntactic content of semi-structured or unstructured data (e.g., data in image files, data in blogs, posts, websites, text descriptions of classifier models). This is in contrast to analyzing "structured" data, such as data in a database. NLP can be configured to parse content to determine semantic context (e.g., meaning of words by analyzing each word in the content against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

Embodiments can use NLP to detect sharing gestures based on the context of a message and the semantic features of character sequences. For example, the sharing gesture determiner 256 may analyze the sentence "Ok, here is the document that describes each of our duties." Based on the context (e.g., here is the document), NLP functionality can determine that a resource is being shared.

The sharing gesture determiner 256 can additionally or alternatively detect sharing gestures in any other manner, such as using one or more machine learning models (e.g., Siamese neural networks, random forests, convolutional neural networks (CNN) and the like), which may use historical labeled sharing gestures as input in order to predict future sharing gestures.

The contextual data extractor/determiner 254 is generally responsible for determining contextual data about an event (e.g., as gathered by the user-data collection component 210). The contextual data may include event context or external context as described herein. Contextual data may be metadata or other data that is not computer resource referenced in the sharing gesture or sharing gesture itself, but describes related information. For example, contextual data may include: all the users within a group when a sharing gesture was issued, the content of messages leading up to and/or following the sharing gesture, which users were active (e.g., shared messages) in a particular communication (e.g., a group meeting), a timestamp indicating when a sharing gesture was posted, resource details, such as file name and the URL where the resource can be located, the type of computer resource shared in the sharing gesture, the type of group the sharing gesture occurred in, and/or the magnitude of change that shared computer resource has undergone since the last sharing gesture for the same resource. Additionally or alternatively, contextual data may include who is present or invited to a group event (e.g., meeting or chat session), the topic of the event, whether the event is recurring or not recurring, the location of the event, the date of the event, the relationship between other projects or other events, information about invited or actual attendees of the event (e.g., company role, whether participants are from the same company, and the like). Some or all of the contextual data can be extracted from the group profile 240, as described below.

In some embodiments, the group event monitor 250 receives event content and related contextual data and generates an enriched activity timeline. In some embodiments, this timeline is a transcript that includes tags and/or other associated content in a data structure. For example, the timeline can include structured data (e.g., a database) that includes records, where each record includes the timeline of each communication or message and a timestamp indicating when the communication started/stopped. The record can alternatively or additionally include contextual information or metadata, such as information about participants of the event or the event itself (e.g., topic of the event, files, slides, or any information in the group profile 240). The timeline can be the output of the meeting monitor 250.

The group profile 240 includes information about group participants or members, personal preferences of meeting attendees, and the like. The group profile 240 includes event activity information 242. This may include indications of when attendees or speakers tend to make sharing gestures. For example, a particular attendee may always provide sharing gestures during the last 5 minutes of a meeting. This information can be used by the sharing gesture determine 256 to make predictions throughout an event to determine whether or not statements are sharing gestures. The group profile 240 may also include how other group members provide sharing gestures.

In some embodiments, event activity information 242 corresponds to identified patterns of historical behavior of one or more members of an event. Such patterns may be or include: patterns in the way participants talk (e.g., participant A always makes jokes even when issuing a command, making it less likely that a candidate is a sharing gesture), tendency to mention sharing gestures at a specific time or time window of an event, pattern of never being the owner of or issuing any sharing gestures, pattern of always being the owner of or issuing sharing gestures, patterns in the way people phrase sharing gestures or interact with others, user's language and style, conversation history as previous communication (e.g., chats, e-mails, and documents) between participants, and the like. Historical patterns can be used to predict whether candidate sharing gestures are indeed sharing gestures.

The group profile 240 can include user preferences 244, which generally includes user settings or preferences associated with the group event monitor 250. By way of example and not limitation, such settings may include user preferences about specific events (and related information) that the user desires be explicitly monitored or not monitored or categories of events to be monitored or not monitored, crowdsourcing preferences, such as whether to use crowdsourced information, or whether the user's event information may be shared as crowdsourcing data; preferences about which events consumers may consume the user's event pattern information; and thresholds, and/or notification preferences, as described herein.

In some embodiments, the user profile 240 includes participant roles of each participant in an event or member of a group. Participant role can be part of the contextual data. In some embodiments, the user profile 240 includes alternative or additional information, such as age of group members, family members of group members and associated information, address of group members, and the like that can be included in the contextual data.

The composite view object generator 280 is generally responsible for generating and/or updating a computer object (also referred to herein as a "composite view") that includes at least some metadata regarding one or more computer resources referenced in a sharing gesture and/or at least a portion of one or more computer resources themselves shared in a sharing gesture. In various embodiments, this "computer object" (e.g., the computer object 237) is a variable, data structure, function, and/or value that can be accessed or referenced in computer memory and that represents information associated with a sharing gesture. In particular embodiments, the computer object is strictly different from a computer resource itself that a sharing gesture references. Rather, in these embodiments, the computer object includes only a portion (e.g., URL and first paragraph of a document) of a computer resource and contextual data, such as some or all of the contextual data obtained from the contextual data extractor/determiner 254. In some embodiments, the computer object does not include a payload or actual content of a computer resource but only includes metadata. For example, the computer object may include a file name of a document, but not the contents of the document itself.

The object instantiation component 288 instantiates computer objects or generates/identifies the rules that are used to generate the computer object. In some embodiments, the object instantiation component 288 references a set of stored conditional statements or other policies to determine how to generate computer objects. In various embodiments, these rules or policies dictate how much of a computer resource is populated in the computer object (or surfaced to a user) and/or how much contextual data is populated in the computer object (or surfaced to a user) depending on various criteria. For example, a rule may specify what to include in the computer object based on the specific type of computer resource (e.g., WORD document, EXCEL spreadsheet, or external internet web link) being shared in a sharing gesture. Additionally or alternatively, the rules may specify what to include in the computer object based on the type of group (e.g., SHAREPOINT v. TEAMS) within which the computer resource was shared. Some embodiments therefore compare the specific computer resource (or associated metadata) shared in a sharing gesture with a list of identifiers representing different computer resources and group types and apply rules associated with those identifiers to determine what is included in the computer object.

The resource content extractor 282 is generally responsible for extracting one or more portions of the computer resource(s) shared in the sharing gesture to populate in the computer object. In various embodiments, this extracting is based on the object instantiation component 288 identifying the set of rules to apply for the extraction. Additionally or alternatively, the extracting is based on information located in the group profile 240 and/or data obtained from the user-data collection component 210. For example, a rule may specify to only populate the computer object with a column (of multiple columns) of a spreadsheet based on the group being a particular group or the document being a particular type. Accordingly, the resource content extractor 282 may extract all the information within this column only and no other columns. In another example, a rule may specify to only populate the computer object with the URL or filename of a computer resource, but not any payload data or content of a resource based on the sensitive nature of the resource (e.g., as determined by analyzing data obtained from the user-data collection component or the group profile 240).

The context generator 286 is generally responsible for extracting metadata associated with a sharing gesture and inputting the metadata into the computer object. For example, the context generator 286 in various embodiments extracts some or all of the contextual data (e.g., external context) obtained by the contextual extractor/determiner 254 and/or user-data collection component 210 to populate the computer object. In various embodiments, this extracting is based on the object instantiation component 288 identifying the set of rules to apply for the contextual data generation. For example, using one or more policies, the context generator 286 may populate the data object with the users that were part of a group when a sharing gesture occurred (e.g., as indicated in the group profile 240 and/or obtained by the user-data collection component 210). Alternatively or additionally, the context generator 286 may populate the data object with the contents of the messages leading up to and following the sharing gesture.

In another example, if the group (e.g., as indicated in the group profile 240) corresponds to a MICROSOFT TEAMS channel or other specific group, a rule may specify to create a new computer object based on the time at which the last computer object was shared and/or how much a computer resource has changed since the last sharing. For instance, if the same WORD document was shared twice, but a week has passed between sharing gestures, embodiments can determine the difference between the word document (e.g., via TF-IDF algorithms) and share a new computer object based on the differences being over a threshold. One reason to make a new computer object is to make it searchable within the group based on contents of messages posted sometime prior and/or following the sharing gesture, or by the names of users that were active in the communication at the time.

In some embodiments, the context generator 286 determines the beginning and end of messages or sharing gestures used to determine how much contextual data to include in a computer object. This may be useful in embodiments where, for example, a user interface or display view does not contain full threads or posts of the group but includes a list of computer resources discussed by the group or other features. In these embodiments, it may be useful to include a certain quantity of contextual data of the messages themselves leading up to and/or after the sharing gesture.

In some embodiments, a first model is used to identify the beginning of the sharing gesture and/or the other messages leading up to and following the sharing gesture and a second model is used to identify the end. These or other model techniques can take several tests together to have one network understand the meaning of a sentence or other character sequence (e.g., phrase, paragraph) based on the tests. Accordingly, these combinations of models can predict, for example, if the next sentence is the answer to the first sentence. In these embodiments, relationships are learned between sentences or other character sequences and the labels or classifications can be whether a character sequence candidate "is the next sentence" or "is not the next sentence." In this way, it can be predicted whether a first sentence, for example, is the sentence that precedes or follows a second sentence or whether the sentence is a random sentence. This can be useful in situations, for example, where a meeting participant starts engaging in a sharing gesture or otherwise engages in discussion of other topics, and then there is a continuation of the discussion. In this way, embodiments can predict that the first two character sequences do not fit with each other. For example, a portion of a transcript may read, "Bob, we have a meeting Friday so [first character sequence] . . . wait Jack, before you keep going let me just say . . . [second character sequence] as I was saying Bob, let's get project X done, here is a link [third character sequence]." Accordingly, embodiments can predict that the first character sequence and the third character sequences go together, which may help indicate that "here is a link" is the sharing gesture and "Bob" is the beginning of the sharing gesture. Likewise, when inputting contextual data into a computer object, the second character sequence can be extracted out or left out from the computer object but the first and third character sequences can be included.

In an example illustration of a model that may be used to define beginnings and/or ends of sharing gestures or other messages that provide contextual data for the sharing gestures, BERT models or other similar models can be used. BERT generates a language model by using an encoder to read content all at once or in parallel (i.e., it is bidirectional), as opposed to reading text from left to right, for example. This allows the model to learn the context of a word or other character sequences based on its event context. The input is a sequence of tokens (e.g., natural language sentence or other character sequence) that are first embedded into vectors (e.g., via GloVe or other word embedding) and then processed through a neural network. The output is a sequence of vectors where each vector corresponds to an input token with the same index. These models overcome typical language models that predict the next word or other character sequence, using a directional approach. However, a directional approach inherently limits context learning because it only uses the context either before or after a word or character sequence.

In some embodiments, defining the end of sharing gestures or associated contextual data to be input into a computer object includes an algorithm of two or more steps. First existing punctuation or ending character sequence ending identifiers (e.g., periods, question marks, semi-colons, and the like) may be identified to determine character sequence length of the text to the left of or preceding the sequence ending identifier. For the second step, a component may extract or copy the next predetermined number of words after the beginning word or other character sequences and feed them through a model to determine if the third (or other predetermined number) word or other character sequences is the sharing gesture's end location. In various embodiments, the second step is done based at least in part on parts of speech of the predetermined word, their corresponding updated display text length, and/or the specific word itself, which may be a word that is typically associated with a command or action item (e.g., an indication that a person is sharing link A "right now," where right now is the end of the sharing gesture).

The output of the composite view object generator 280 is a computer object that contains one or more portions of a computer resource(s), contextual data associated with a sharing gesture(s), and/or one or more explicitly defined sharing gestures. For example, a composite view or computer object of a sharing gesture may include which users were active in an event (e.g., a communication session, such as a chat or meeting) when the sharing gesture occurred, computer resource details, such as filename and the URL where the computer resource is located, the beginning and end word sequences of the sharing gesture, beginning and end word sequences of various messages before and/or after the sharing gesture, and the like. In various embodiments, the generated computer object is addressable and accessible in its entirety in computer memory.

The client-resource runtime evaluator 260 is generally responsible for at least partially executing a runtime query or request of a user and returning the computer object and/or the computer resource based on the user's access credentials. In various embodiments, the request is for: a particular computer resource discussed in a group, access to the group (or group event) itself, and/or certain features (e.g., a "resources" tab or container that lists computer resources) of the group.

The client-resource runtime evaluator compares the requesting user's access credentials with an ACL needed to access the computer object and computer resource itself. An ACL indicates one or more particular access control levels needed to access a corresponding resource or computer object. Each access control level can specify an individual (e.g., a name of a person), user (e.g., a particular service or end user), or security groups whose members have access to the resources or computer objects, required labels, information barriers, and the like. Each ACL includes one or more access control level identifiers corresponding to one or more access control levels.

The resource ACL checker 261 is generally responsible for determining whether the requesting user has access to one or more corresponding resources (or instances, referred to herein as "properties" of a resource) based on comparing the user's access credentials to one or more ACLs needed to access the computer resource. For example, in order to access a first computer resource, the ACL may indicate "[Jane Doe; John Doe]," where "Jane Doe" is a first access control level identifier and "John Doe" is a second access control level identifier. This ACL may indicate that in order to access the first resource, the requesting user must need to be Jane Doe or John Doe. In this way, when a user requests access to the computer resource, some embodiments efficiently return only properties of the computer resource that the user has access to by comparing the user's access credentials with the one or more access control level identifiers. Accordingly, different queries by different users for the concept can render very different information depending on the access credentials of the users. Accordingly, for example, if the user does not have access to a computer resource, the resource ACL checker 261 can modify the computer object generated by the composite view object generator 280 by removing one or more portions of the computer resource.

The group ACL checker 262 is generally responsible for determining whether the requesting user has access to one or more computer objects generated by the composite view object generator 280 based on comparing the user's access credentials to one or more group ACLs needed to access the one or more computer objects. In various embodiments, the group ACL needed to access the one or more computer objects is different than the ACL needed to access the corresponding resources shared in a sharing gesture or require respective checks for both. For instance, users may be members of a particular group but do not have access to the resources they share. Alternatively, users may have access to a particular computer resource but they may not be part of a particular group.

In some embodiments, the group ACL checker 262 (and/or the resource ACL checker 261) determines whether users have subscribed to a particular service or resource, referred to as a "subscription." In some embodiments, the group ACL checker 262 prevents access to the computer object (or the resource ACL checker 261 prevents access to the resource) if a particular user is not a subscriber to the subscription. Subscriptions or licenses to such subscriptions can be purchased, in some instances. For example, the subscription can correspond to purchase of application sets (e.g., MICROSOFT 365), a purchase of subscription to a set of tools (e.g., encryption engines), and the like.

Various embodiments associate computer objects with a group access control level needed to access the computer object such that any user that does not meet the group access control level is not a member of the group and/or is prevented from accessing the computer object. For example, in order to access a first computer object, the ACL may indicate "[security group A; security group B]," where "security group A" is a first access control level identifier and "security group B" is a second access control level identifier. This ACL may indicate that in order to access the first computer object, the requesting user must need to be a member of "security group A" (e.g., a first MICROSOFT TEAMS channel) and/or "security group B" (e.g., a second MICROSOFT TEAMS channel). In this way, when a user requests access to the computer object, some embodiments efficiently return only information within the computer object that the user has access to by comparing the user's access credentials with the one or more access control level identifiers. Accordingly, for example, if the user does not have access to all of the information within a generated computer object, the resource ACL checker 261 can modify the computer object generated by the composite view object generator 280 by removing or replacing one or more portions of the computer object. For instance, if the requesting user is not part of security group A, then contextual data associated with the sharing gesture is not presented.

Example system 200 also includes a presentation component 220 that is generally responsible for presenting content and related information to a user, such as indications (e.g., contents within) the generated computer object and/or computer resources. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, and/or other user data, presentation component 220 may determine on which user device(s) content is presented, as well as the context of the presentation, such as how (or in what format and how much content, which can be dependent on the user device or context) it is presented, when it is presented. In particular, in some embodiments, presentation component 220 applies content logic to device features, or sensed user data to determine aspects of content presentation.

In some embodiments, presentation component 220 generates user interface features associated with a computer object generated by the composite view object generator 280 and/or the associated computer resource. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 220 can present a list of sharing gestures or contextual data that include the highlighted boundaries (e.g., beginning and end) determined by the composite view object generator 280. The presentation component 220 can additionally or alternatively present other contextual data (e.g., as extracted by the user-data collection component 210 or located in the group profile 240), who stated a message or sharing gesture, members of the group when a sharing gesture occurred, timestamp of the sharing gesture or any other data included in the computer object generated by the composite view object generator 280.

In some embodiments, a personal assistant service or application operating in conjunction with presentation component 220 determines when and how (e.g., presenting only sharing gestures and/or contextual data as opposed to an entire meeting transcript) to present the content. In such embodiments, the content, including content logic, may be understood as a recommendation to the presentation component 220 (and/or personal assistant service or application) for when and how to present the notification, which may be overridden by the personal assistant application or presentation component 220.

Continuing with FIG. 2, as described previously, example system 200 may include or operate in conjunction with one or more consumer applications 290. Consumer applications 290 generally refers to one or more computer applications or services, such as online/cloud applications or locally stored applications that consume or utilize the computer objects or computer resources determined by system 200. In particular, a consumer application 290 may receive a sharing gesture for a group, and present, manage, or schedule aspects (e.g., contextual data) of the sharing gesture to the group. In some embodiments, a consumer application 290 may utilize the presentation component 220 to provide a computer object generated by the composite view object generator 280 to a user within a particular group. Examples of consumer applications 290 may include, without limitation, computer applications or services for facilitating meetings or communications (e.g., MICROSOFT TEAMS®, MICROSOFT DYNAMICS®); email, messaging, chat, or calling; project management; calendar or scheduling; and task list or to-do applications (e.g., MICROSOFT WUNDERLIST®, MICROSOFT TO-DO®)).

Example system 200 also includes storage 225. Storage 225 generally stores information including data, data structures, computer instructions (e.g., software program instructions, routines, or services), and/or models (e.g., machine learning models) used in some embodiments of the technologies described herein. In an embodiment, storage 225 comprises a data store (or computer data memory). Further, although depicted as a single data store component, storage 225 may be embodied as one or more data stores (e.g., a distributed storage network) or may be in the cloud. Storage 225 includes the group profile 240, the computer resource(s) 235, and the one or more computer objects 237 generated by the composite view object generator 280. In some embodiments, the one or more computer objects 237 maps one or more computer resources and/or computer objects to the ACLs needed for access, as described in more detail below.

Figure 3:
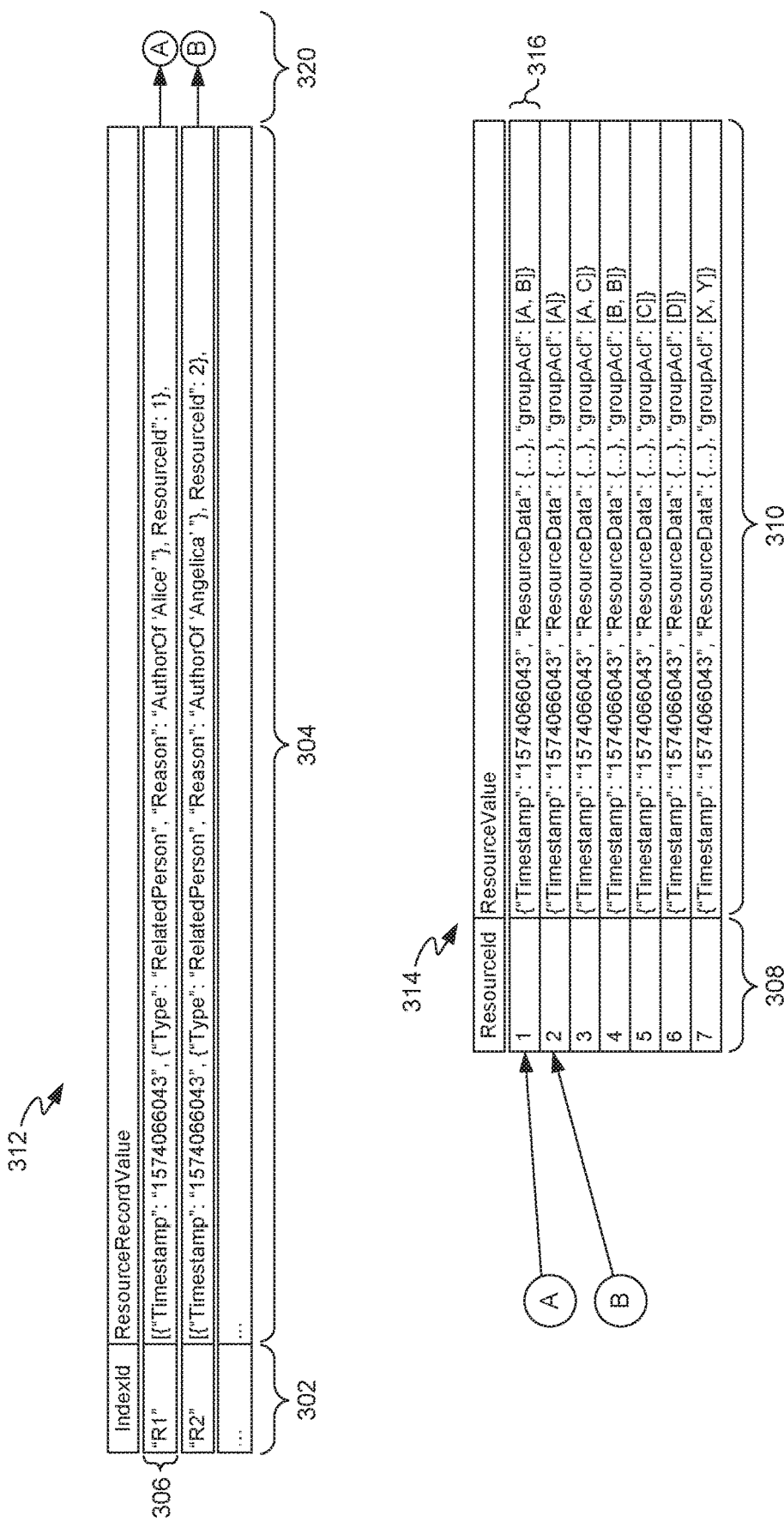
FIG. 3 is schematic diagram of an example index table and resource table used to access one or more resources and contextual data, in accordance with embodiments of the present disclosure.

FIG. 3 is schematic diagram of an example index table and resource table used to access one or more resources and contextual data, according to some embodiments of this disclosure. In some embodiments, the index table 312 and/or the resource table 314 represents the one or more computer objects 237 of FIG. 2. In some embodiments, the index table 312 and/or the resource table 314 represents the computer object or contents of the computer object as described herein, such as the computer object generated or updated by the composite view objet generator 280.

The index table 312 is illustrated as a key-value pair where the key or index ID 302 indicates a given computer resource and the values 304 indicate the resource IDs (and not the content of the resources themselves). The values 304 also indicate metadata (e.g., as generated by the context generator 286) associated with particular resources, such as timestamps of when a sharing gestures, the "type" of: group, resource, event (e.g., meeting), and the like. In some embodiments, the metadata may additionally or alternatively include a "reason" indicator, which provides more detailed information for the "type" so that users or embodiments can better understand how a particular resource is related to other resources or contextual data. For example, a relationship type may be "related person," which indicates one or more persons associated with the resource in some specific way. For instance, the metadata can include the name of the person that shared a resource in a sharing gesture, the name of the person who the resource was directed to, and the like. In another example, the reason indicator may, for example, identify each user or person that is related to the corresponding resource based on their specific user activity (e.g., clicks, selections, queries, or other user input) on the corresponding resource or references within the resource (e.g., their name may be listed in the resource). In illustrative example, a user may modify or author a particular document, or may be mentioned or referenced by an email address in a document. Accordingly, the relationship type may be "related person," and the reason indicator may specify the name or ID of the user and the specific modification (e.g., delete Y, insert X).

In some embodiments, the relationship type is a "related document" identifier, which indicates that there is a related document (or other resource) to for a given resource. The related document reason indicator may specifically describe why a resource is related to a given concept other resources for the same concept. For example, reasons can be that the document contains a particular paragraph, sentence, phrase, acronym, and/or the like that references other documents. In this way, a user can quickly locate other related computer resources since this information can be contained in the data object.

As illustrated in the index table 312, each index ID is mapped to or associated with a resource ID and its metadata (e.g., contextual data). For example, the record 306 indicates that the index ID R1 (resource 1) is mapped to the resource ID of 1 and its metadata, meaning that resource 1 and its metadata is to be fetched or otherwise accessed to complete any request associated with resource 1.

The resource table 314 is also illustrated as a key-value pair where the key indicates the resource ID 308 and the values 310 correspond to the content or payload of the corresponding resource from the resource IDs 308, group ACLs needed to access the corresponding reference (or other metadata, such as "timestamp"). Each record or entry indicates a specific computer resource that is mapped to resource contents (e.g., payload of a resource), the specific ACL needed to access the specific resource, as well as metadata. For example, record 316 indicates resource ID 1 and its contents, and that access control level identifiers A and B are needed (i.e., user's access credentials must match A and B) to access the contents, as well as metadata (e.g., as extracted by the contextual data extractor/determiner 254 and/or context generator 286). In some embodiments, the index table 312 and/or the resource table 314 is presented or displayed to a computing device such that an administrator can view the information, such as the relationships, as well as modify information, such as the amount of metadata or contextual data mapped to a given resource. Alternatively, in some embodiments, the index table 312 and/or the resource table 314 are data structures to be accessed in the background and are not presented to administrators but are rather to be generated by programmers to execute requests.

FIG. 3 also illustrates the relationship between the index table 312 and the resource table 314 at runtime. For example, a user may issue a query or select a feature on a graphical user interface that corresponds to resource 1. Responsively, some embodiments receive this request and locate the corresponding concept under the index ID 302, which is located in record 306. Responsively, some embodiments identify the resource ID 1 within the index data structure 312 and lookup each corresponding resource ID under the resource ID column 308 of the resource table 314, as illustrated by the reference indicators 320 representing pointer values or other references. In this way, the index table 312 is a helper data structure that references entries within the resource table 314. In some instances, each of the resources 1 and 2 can be accessed by the requesting user. This is because the claim set of the user may include claims that are needed for the corresponding ACLs of each resource. A "claim set" as described herein refers to all the "claims" or access credentials of a user. Access credentials of a user can correspond to a user's group memberships, access control levels, job title, and/or any other privileges or security clearances that the user possesses. That is, the requesting user may have claim A and claim B access credentials. Because claim A and claim B of the user's claim set may match the ACL needed to access resource ID 1 and 2, the corresponding computer resource and computer object or metadata associated with the computer resource is accessible.

Figure 4:
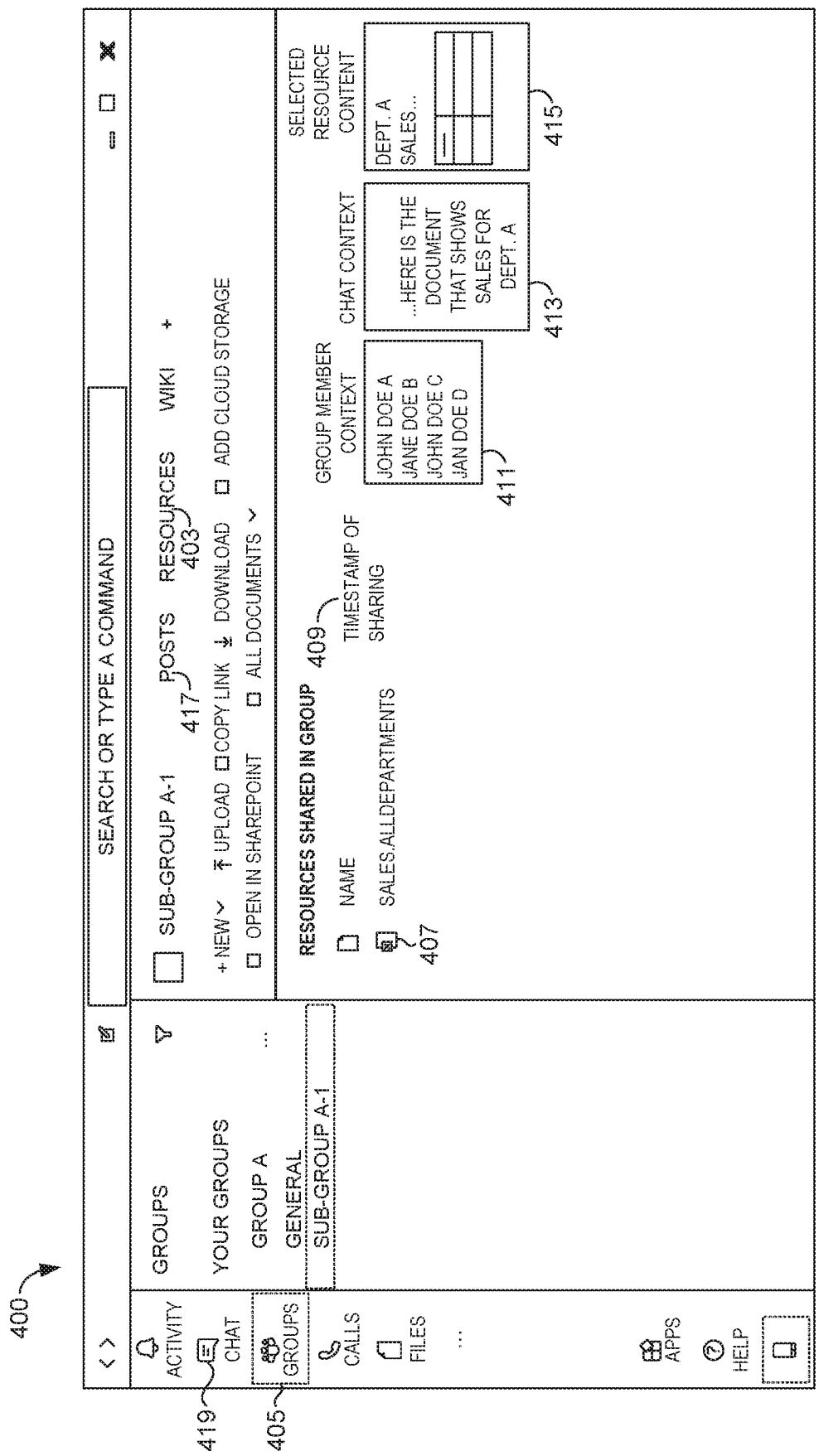
FIG. 4 depicts an illustrative screenshot of a user interface that includes indications of a computer object surfaced back to a user, in accordance with embodiments of the present disclosure.

Turning now to FIG. 4, a screenshot 400 of a user interface that includes indications of a computer object surfaced to a user, according to some embodiments. In some embodiments, the screenshot 400 represents what is output by the presentation component 220 of FIG. 2. In some embodiments, the screenshot 400 represents the final output after all the components of FIG. 2 (i.e., user-data collection component 210, group event monitor 250, composite view object generator 280, and client-resource runtime evaluator 260) have performed their functionality. In some embodiments, the screenshot 400 represents an aspect of the computerized group container as described herein.

FIG. 4 represents what may be presented to a user device of a user of a group whose access credentials meet both a resource access control level (e.g., as determined by the resource ACL checker 261) and a group access control level (e.g., as determined by the group ACL checker 262). Specifically, an indication of an entire computer object (e.g., the computer object generated by the composite view object generator 280) is presented along with a portion of a computer resource. That is, based on the access credentials of a particular group member meeting both the resource access control level and the group access control level, a user device associated with the particular group member is presented with the portion (or indication) of the computer resource indicated in the UI element 415 and an indication of the computer object as shown in the UI elements 407, 409, 411, 413, and 415. An indication of a computer object as described herein may be or include specific data (e.g., metadata) contained in a computer object, such as a data structure. Additionally, the indication of the computer object may be or include the exact computer object itself or a portion thereof.

While specific UI features of the screenshot 400 (and screenshots 500 and 600) have particular functionality, it is understood that any suitable UI features (e.g., buttons, menus, dials, ribbons, dialog boxes, and the like) can alternatively or additionally be utilized herein. For instance, in response to receiving a user selection of the groups button 405, embodiments (e.g., the presentation component 220) cause display of all of the groups or sub-groups (e.g., channels) to which the requesting user belongs. Further, in response to receiving a user selection of the chat button 419 (or "posts" identifier 417), embodiments cause display of a chat history of a particular group (or sub-group if identifier 417 is selected). In some embodiments, the chat history shows each electronic message or post sent by members of the group or sub-group. Alternatively or additionally, the chat history may show the timestamps at which each message was sent or received. Alternatively or additionally, the chat history may show the names or avatars of meeting participants who sent the messages.

As contemplated herein, chat histories for a particular group can become quite lengthy and so it may be arduous for users to scroll or drill through lengthy chat history transcripts looking for resources or contextual data surrounding messages. Accordingly, some embodiments provide screenshots (such as the screenshot 400), pages, APIs, lists, or otherwise condense chat histories to the individual resources and contextual data surrounding resources, which not only improves computing consumption, but makes it easier for users to access without drilling down too many layers of information. Accordingly, for example, in response to a user selecting the group button 405 (and/or the resources identifier 403), the screenshot 400 may be caused to be displayed. Screenshot 400 represents a re-structured or condensed list of elements of the entire chat history of a group such that it does not contain an entire chat history of a group.

The screenshot 400 lists each computer resource shared in the group or sub-group and an indication of a computer object to which the specific user of the group has access. Specifically, the user is a member of sub-group A-1 of the larger group A. Sub-group A-1 may be department A sales team in a larger sales force. As part of the chat history, one of the group members may have tried to share a particular resource. For example, John Doe may have stated, "Ok everyone, here is the document that describes how we did last quarter." In response to identifying this sharing gesture (e.g., via the sharing gesture determiner 256) certain embodiments generate a data object (e.g., via the composite view object generator 280) and/or check each group member's resource access credentials (e.g., via the resource ACL checker) to ensure that each member has access to the resource that is being requested to be shared among the group. In some embodiments, because members of the group are already present or have already logged into a chat session for the group at the time the sharing gesture was determined, access credentials may be inferred. That is, the group member's access credentials need not be compared against a group ACL (e.g., via the group ACL checker 262) to determine whether indications of the computer object should be presented to the user. In such embodiments, the group ACL requirement may automatically be flagged as being met and/or display of indications of the computer object may otherwise be caused.

As described above, because a particular group member's access credentials meets both the resource ACL and the group ACL, UI elements 407, 409, 411, 413, and 415 are caused to be displayed. UI element 407 corresponds to both a link and filename of an EXCEL spreadsheet computer resource that contains sales data to all departments (e.g., as determined by the contextual extractor/determiner 254). UI element 409 corresponds to a timestamp that indicates the time at which the sharing gesture was posted in a chat history (e.g., as determined by the contextual extractor/ determiner 254). In some instances, users might want to know this timestamp so that they can switch to a page that includes the entire chat history (e.g., in response to a selection of the chat button 419) or transcripts by using the timestamp as an index or reference point to see additional context in the chat history. UI element 411 corresponds to other contextual data, such as the names of group members that existed at the time the sharing gesture was made (e.g., as determined by the contextual extractor/determiner 254). In some instances users may want to know identities of group members when a resource was shared because groups can expand many members over a short amount of time and a user may want to ask the members for more information about the resource, such as why exactly it was posted and the like. In various instances, certain containers or views contain a full transcript history, such as a container of messages between group members in response to a selection of the chat button 419. UI element 413 corresponds to chat context or event context of the chat history that leads up to and/or follows the sharing gesture (e.g., as determined by the contextual extractor/determiner 254) so that users do not have to manually scroll through or otherwise view a full transcript history. Users may want to view the immediate messages before and/or after the sharing gesture was made to get more insight as to what the link or computer resource refers to and/or other contextual data without having to, for example, click on the chat button 419 to find computer references and associated context. In some situations, the UI element 413 provides a reference indicator so that the user can easily go to or locate the sharing gesture within full transcripts after a selection of the chat button 419. UI element 415 corresponds to a direct display of a portion of the actual content of the EXCEL document computer resource. This is contrasted with a requirement to select a link (e.g., a hyperlink) to open a document, which is computing resource intensive. Rather, embodiments can directly cause display of a resource (or portion of the resource). This makes it easier for users to access relevant resource data without having to wait or locate relevant data via scrolling and the like. For example, as described above, the user may be a sub-group member of department A sales group. However, the resource corresponding to UI 407 may include sales data for all departments B, C, and D. Accordingly, embodiments (e.g., the contextual extractor/determiner 254) determine that the user is a member of department A sales group and/or the group's chat history is referencing department A and locate (e.g., via NLP or other learning models described above) the corresponding information within the computer resource. These embodiments further cause display within the UI element 415 of only the department A sales data and affirmatively do not cause display of the other department sales data since it is not relevant for the group and/or chat history. In some embodiments, the requesting user only has access (e.g., as determined by the resource ACL checker 2610 to the information within the UI element 415 (i.e., department A sales data) and so no other portion of the resource can be shown. In these embodiments, users may only have access to a portion or property of a computer resource an so only portions of the resource may be shown.

Figure 5:
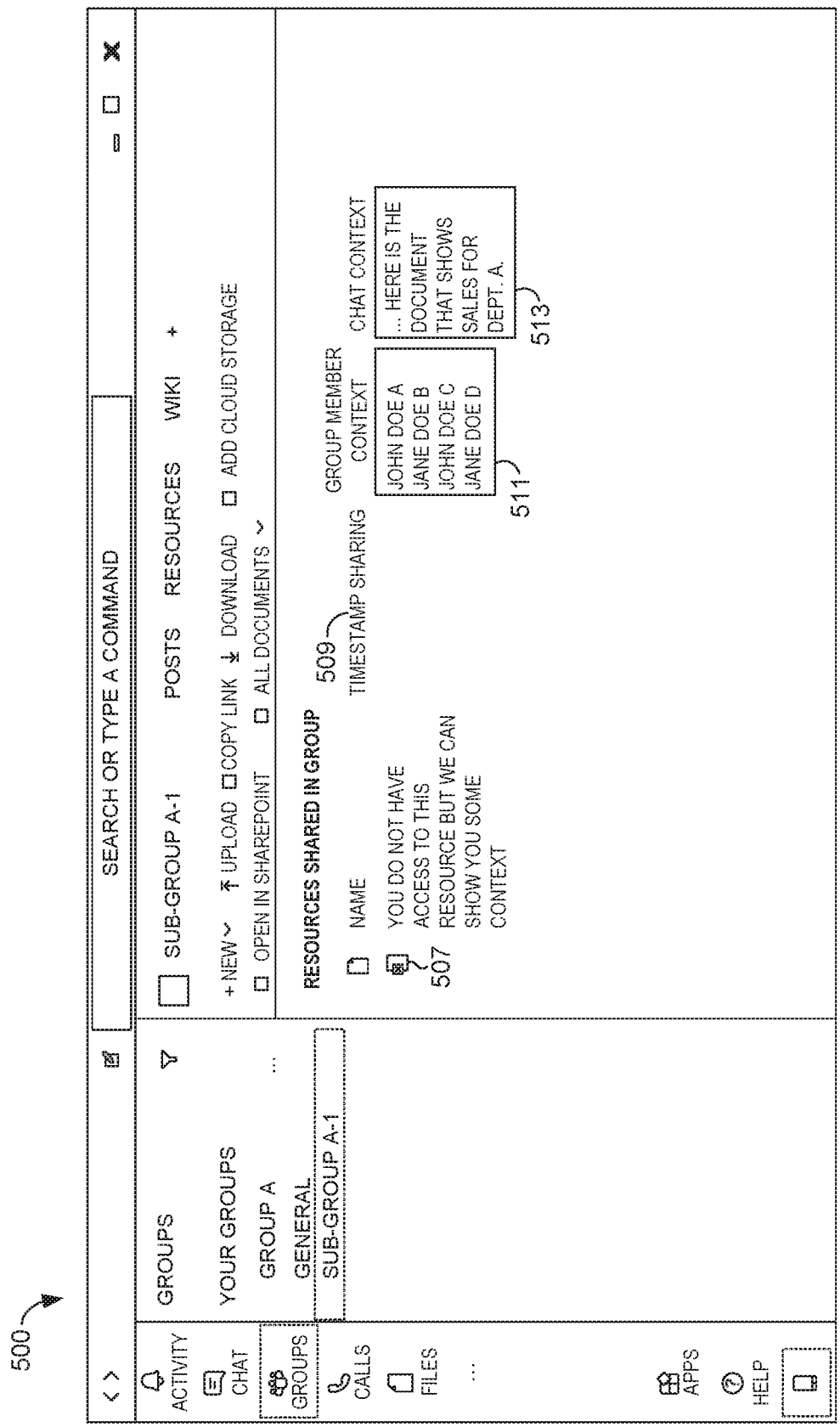
FIG. 5 depicts an illustrative screenshot of a user interface that includes indications of a computer object surfaced back to a user, in accordance with embodiments of the present disclosure.

Turning now to FIG. 5, an example screenshot 500 of a user interface that includes indications of a computer object surfaced to a user, according to some embodiments. In some embodiments, FIG. 5 represents a screenshot displayed to a different user device associated with a different member of the same group relative to the user device and group member and user device of FIG. 4. That is, in some embodiments, the example screenshot 500 represents a different view of the same computer resource and its contextual data relative to the screenshot 400. In some embodiments, the screenshot 500 represents what is output by the presentation component 220 of FIG. 2. In some embodiments, the screenshot 500 represents the final output after all the components of FIG. 2 (i.e., user-data collection component 210, group event monitor 250, composite view object generator 280, and client-resource runtime evaluator 260) have performed their functionality. In some embodiments, the screenshot 500 represents an aspect of the computerized group container as described herein.

FIG. 5 represents one example of what can be presented to a user device of a user of a group whose access credentials do not meet a resource access control level (e.g., as determined by the resource ACL checker 261) but meets a group access control level (e.g., as determined by the group ACL checker 262). Specifically, an indication of an entire computer object (e.g., the computer object generated by the composite view object generator 280) is presented but the computer resource referenced in a sharing gesture is not presented. That is, based on the access credentials of a particular group member not meeting the resource access control level but meeting the group access control level, a user device associated with the particular group member is only presented with an indication of the computer object as shown in the UI elements 507, 509, 511, and 513.

The example screenshot 500 lists each indication of a computer object to which this specific user of the group has access. Specifically, in this example, the user is a member of sub-group A-1 of the larger group A. sub-group A-1 may be department A sales team in a larger sales force as described in FIG. 4, for instance. As part of the chat history, one of the group members may have tried to share a particular resource. For example, as illustrated in FIG. 4, John Doe may have stated, "Ok everyone, here is the document that describes how we did last quarter." In response to identifying this sharing gesture (e.g., via the sharing gesture determiner 256) certain embodiments generate a data object (e.g., via the composite view object generator 280) and/or check each group member's resource access credentials (e.g., via the resource ACL checker) to ensure that each member has access to the resource that is being requested to be shared among the group. In this case, this user does not have access to the EXCEL document being shared.

Because this particular group member's access credentials do not meet the resource ACL but meets the group ACL, UI elements 507, 509, 511, and 513 are caused to be displayed. UI element 507 may normally provide a link and filename of an EXCEL spreadsheet computer resource that contains sales data to all departments (e.g., as determined by the contextual extractor/determiner 254). However, because this user does not have access to the document, embodiments notify the user that she does not have access but other contextual data can be shown, such as elements 509, 511, and 513. UI element 509 corresponds to a timestamp that indicates the time at which the sharing gesture of the EXCEL document was posted in a chat history (e.g., as determined by the contextual extractor/determiner 254). UI element 511 corresponds to other contextual data, such as the names of group members that existed at the time the sharing gesture was made (e.g., as determined by the contextual extractor/determiner 254). UI element 513 corresponds to chat context or event context of the chat history that leads up to and/or follows the sharing gesture (e.g., as determined by the contextual extractor/determiner 254).

This example screenshot 500 does not contain a UI element similar to UI element 415 corresponding to a direct display of a portion of the actual content of the EXCEL document computer resource, because the user does not have access to the contents or payload of the document itself. Some embodiments of the UI represented by example screenshot 500 may include a link, button, or other UI element to request access to the computer resource 507. This may be helpful in situations where the sharer does not realize that the particular user does not have access to the computer resource 507. Accordingly, certain embodiments send a notification (e.g., to the sharer or another group member, administrator, or other individual responsible for access to the computer resource 507) in response to receiving a selection of this UI element, which indicates a request for the individual to have access.

Figure 6:
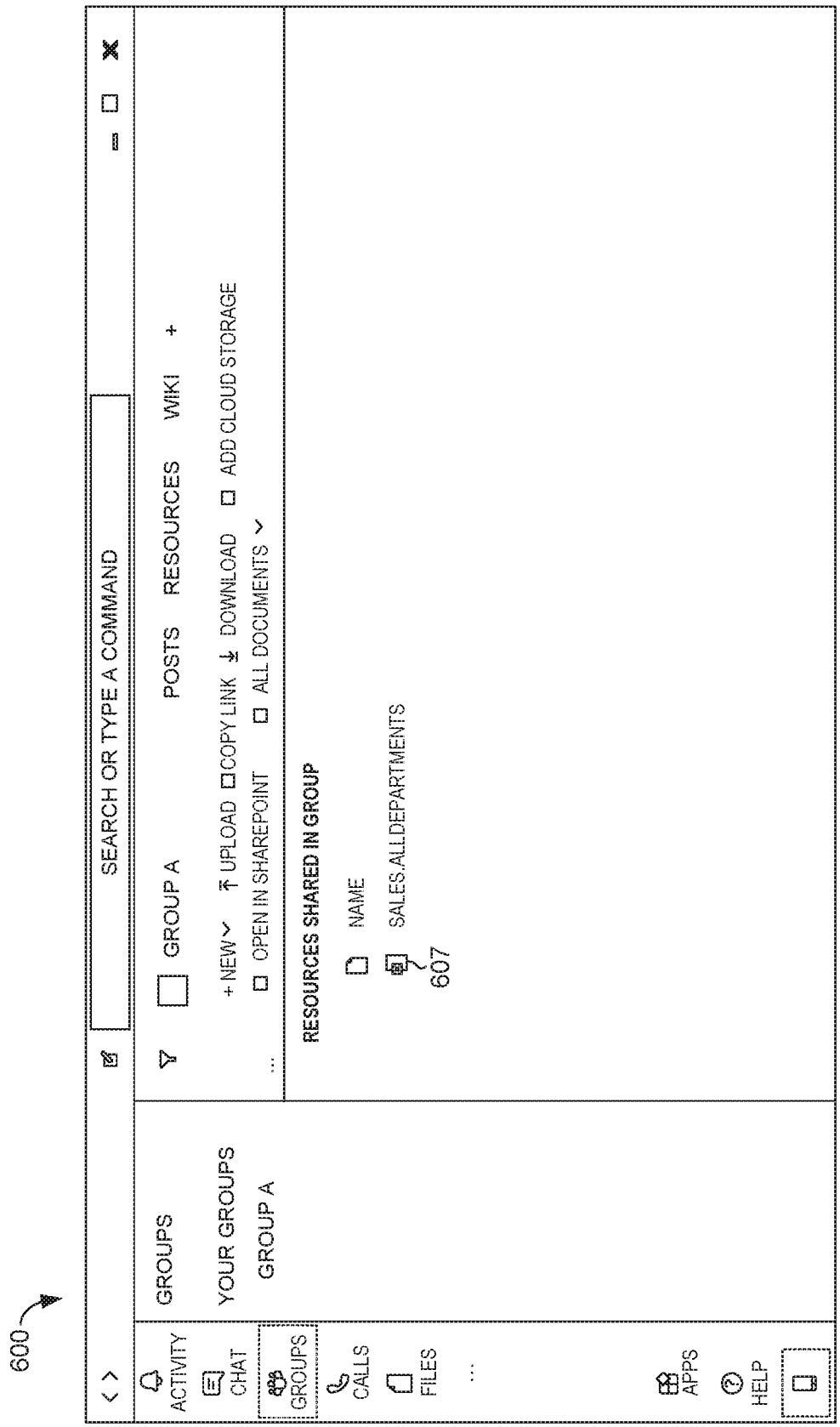
FIG. 6 depicts an illustrative screenshot of a user interface that includes a computer reference surfaced back to a user, in accordance with embodiments of the present disclosure.

Turning now to FIG. 6, a screenshot 600 is provided showing an example user interface that includes a computer reference surfaced to a user, according to some embodiments. In some embodiments, FIG. 6 represents a screenshot displayed to a different user device associated with a different group member relative to the user device and group member of FIG. 4 and FIG. 5. That is, in some embodiments, the example screenshot 600 represents a different view of the same computer resource relative to the screenshots 400 and 500. In some embodiments, the screenshot 600 represents what is output by the presentation component 220 of FIG. 2. In some embodiments, the screenshot 600 represents a final output after the components of FIG. 2 (i.e., user-data collection component 210, the group event monitor 250, composite view object generator 280, and the client-resource runtime evaluator 260) have performed their functionality. In some embodiments, the example screenshot 600 represents an aspect of the computerized group container as described herein.

FIG. 6 represents what may be presented to a user device of a user of a group whose access credentials meet a resource access control level (e.g., as determined by the resource ACL checker 261) but does not meet a group access control level (e.g., as determined by the group ACL checker 262). Specifically, an indication of an entire computer object (e.g., the computer object generated by the composite view object generator 280) is affirmatively not presented but the computer resource referenced in a sharing gesture is presented. That is, based on the access credentials of a particular user meeting the resource access control level but not meeting the group access control level, a user device associated with the user is only presented with the computer resource or link or computer resource itself as indicated in the UI element 607.

The example embodiment depicted in screenshot 600 lists each computer resource this specific example user has access to. Specifically, this example user is not a member of sub-group A-1 but is a member of the larger group A. Sub-group A-1 may be department A sales team in a larger sales force as described in FIG. 4. As part of the chat history, one of the group members of sub-group A-1 may have tried to share a particular resource. For example, as illustrated in FIG. 4, Jane Doe may have stated, "Ok everyone, here is the document that describes how we did last quarter." Subsequent to identifying this sharing gesture (e.g., via the sharing gesture determiner 256) certain embodiments generate a data object (e.g., via the composite view object generator 280) and check each requesting user's group ACL and resource ACL to ensure that each user has access to the resource and computer object that is being requested. In this case, this user has access to the EXCEL document that was shared in sub-group A-1 but is not a member of or meets the group ACL such that the user does not have access to the corresponding computer object.

Because this particular group member's access credentials meets the resource ACL but does not meet the group ACL, only UI element 607 may be displayed. If the user was a member of the group or otherwise met the group ACL, she would normally be presented with contextual data surrounding the sharing gesture (e.g., as indicated in the UI elements 409, 411, 413, and 415). However, because this user does not have access to the computer object, embodiments may encrypt, mask, obfuscate, or otherwise not show content within the data object. It is noted that even though this example user has access to the computer resource 607, particular embodiments may encrypt, mask, or obfuscate the computer resource 607 itself, or otherwise may not show an indication that this specific computer resource 607 was shared. This is because in some situations it may still be a breach of confidentiality to show that particular resources are shared within communication groups, even if a user technically has access to the computer resource 607. It is contemplated that in some embodiments, the user does not have access to a computer resource or computer object. That is, they do not have access credentials that meet both the resource ACL and the group ACL. In these embodiments, UI elements 407, 409, 411, 413, and 415 of FIG. 4, for example, would be encrypted, masked, obfuscated, or otherwise not be presented.

Figure 7:
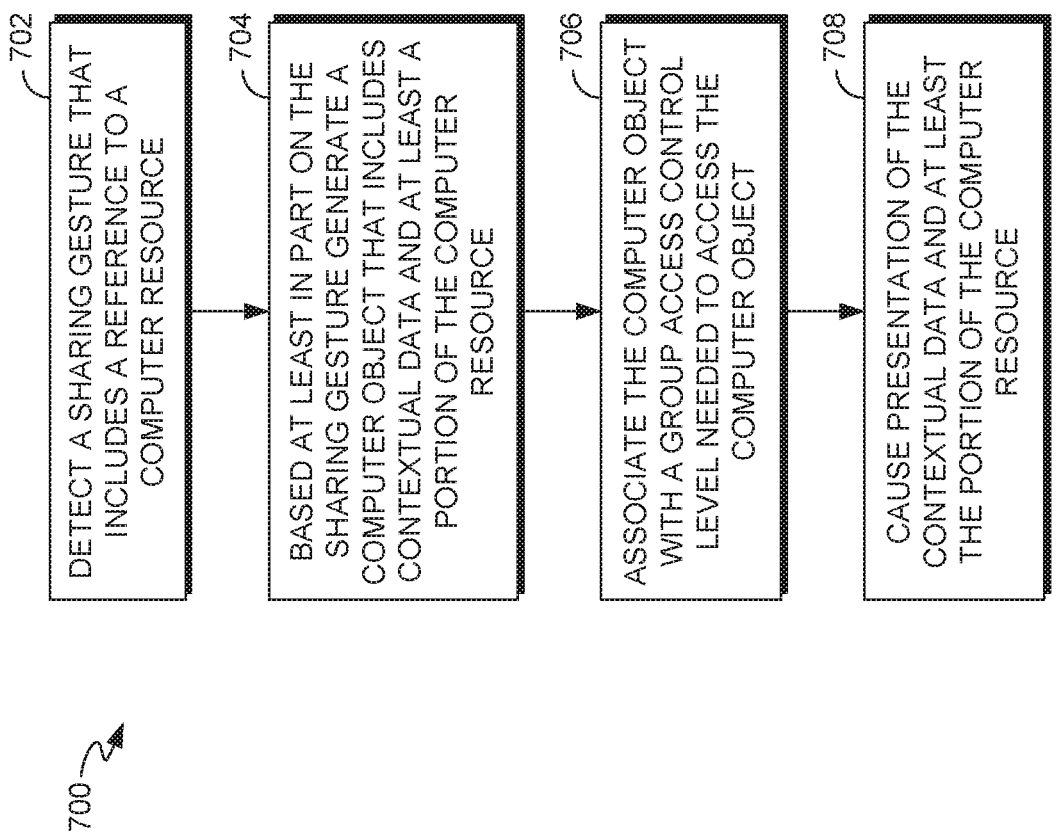
FIG. 7 is a flow diagram of an example process for causing presentation of contextual data and at least a portion of a computer resource, in accordance with embodiments of the present disclosure.

Turning now to FIG. 7, a flow diagram of an example process 700 for causing presentation of contextual data and at least a portion of a computer resource, according to some embodiments. The process 700 (and/or any of the functionality described herein, such as process 800 and 900) may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments the process 700 does not include block 704 and/or block 706 but instead are replaced by other functionality described herein. Any added blocks may include blocks that embody any functionality described herein. The computer-implemented method, the system (that includes at least one computing device having at least one processor and at least one computer readable storage medium), and/or the computer storage media as described herein may perform or be caused to perform the processes 700 or any other functionality described herein.

Per block 702, a sharing gesture that includes a reference to a computer resource is detected. In some embodiments, the sharing gesture is included in a message sent by a participant (or group member) within a computerized group container. The computerized group container in particular embodiments is configured to store one or more electronic messages exchanged between a plurality of participants of a group. In some embodiments, block 702 is performed by the sharing gesture determiner 256, the functionality of which is described herein. Some embodiments alternatively or additionally "receive" the sharing gesture. In these embodiments, the sharing gesture is included in a message sent by a participant within a communication group that includes a plurality of participants (or group members). For instance, the composite view object generator 280 can receive the sharing gesture from the meeting monitor 250.

In some embodiments, the reference described herein is at least one reference from a group of references consisting of: a stand-alone URL or link (e.g., a hyperlink or other link that references a URL) to a web resource (e.g., a web page), a link to a document or file (e.g., the link indicated within the UI feature 407 of FIG. 4), and a natural language description of the computer resource. In some embodiments, the natural language description of the computer resource corresponds to a message within the communication group or computerized group container that describes the resource (e.g., without providing a link to directly access the computer resource). For example, a group participant may say, "look at the document I sent you last Friday."

In an example illustration of block 702, in a communication group (or computerized group container) a group member may share a link to an article on the web or a link to a WORD document. Accordingly, embodiments can detect (e.g., via the sharing gesture determiner 256) the sharing of the link and determine that the sharing or posting of the link is a sharing gesture.

Per block 704, based at least in part on the sharing gesture, certain embodiments generate (or update) a computer object that includes the contextual data and at least a portion of the computer resource (or indication of the computer resource). For example, the sharing gesture may dictate one or more rules (e.g., based on the type of resource in the sharing gesture) to apply for what (and/or how much) particular contextual data to include in the computer object and/or what properties (e.g., sub-sections) of the computer resource to (e.g., as determined by the object instantiation component 288). In some embodiments, the computer object is additionally or alternatively generated based at least in part on one or more attributes of the communication group (e.g., type of group where the sharing gesture occurred, number of group participants, the length of a chat history of the group, and the amount of external context surrounding the computer resource that is available). In some embodiments, block 704 is performed by the composite view object generator 280 through the functionality as described herein.

In an example illustration of block 704, the computer object of the sharing gesture might include: which users were part of the group when the sharing occurred, the contents of the messages leading up to and following the sharing gesture, which users were active in that communication when the sharing happen, as well as resource details such as filename and the URL where the resources can be located.

In some embodiments, alternative to or in addition to generating the computer object, block 704 can include determining one or more rules to apply that indicate what contextual data associated with the computer resource to extract or indicate how much of a computer resource to extract. And based at least in part on the one or more rules, particular embodiments extract the contextual data associated with the computer resource and extract at least a portion (or indication) of the computer resource. For example, embodiments can determine the type of computer resource (or sharing gesture) being shared (e.g., a web application page) and locate, in memory, a rule that indicates that if that type of resource (or sharing gesture) is shared, then certain types (e.g., external context v. event context) of contextual data, a certain amount of contextual data, or specific contextual data should be presented. For instance, embodiments can determine that the reference was a natural language reference (e.g., via NLP) to a resource without a link (or resource itself) and embodiments can extract and obtain the actual link or resource itself based on this determination. In some embodiments, these one or more rules are the same rules used by the computer object described above or the rules used by the object instantiation component 288 as described herein.

With regard to the one or more rules, in another example, embodiments can determine the type of group that the sharing gesture occurred within and locate, in memory, a rule that indicates that if a group is a certain type of group (e.g., a "soccer mom" group or specific application that hosts a group), then certain types (e.g., external context v. event context) of contextual data, a certain amount of contextual data, or specific contextual data should be extracted. For example, if the group corresponds to a MICROSOFT TEAMS channel, timing of when a resource shared can be important for determining when/how information is extracted and surfaced back to the user. For instance, if the same WORD document is shared twice, but a week has passed between the sharing gestures, it may make sense to create a new composite view or extract/render new information for the second sharing gesture. One reason for doing this could be to make the information or view searchable within the group based on the contents of message posted sometime prior to and/or following the sharing gesture, or by the names of the users that were active in the communication group at that time.

With regard to the one or more rules, in another example, embodiments can determine the user experiences (UE) (e.g., pages, APIs, or UI layout) that the computer resource(s) will be posted to and locate, in memory, a rule that indicates that if the UE is of a certain type (e.g., a UI that includes all the chat history), then certain types (e.g., external context v. event context) of contextual data, a certain amount of contextual data, or specific contextual data should be extracted or presented. For instance, if it is determined that the resources will already be embedded in a chat history of messages, then embodiments can determine that no event context is needed, but rather external context can be extracted and then presented. In another example, if it is known that the UI will only list the computer resource, then a rule can indicate that event context leading up to and/or after the sharing gesture can additionally be presented along with the list of resources.

It is noted that some user experiences rely on aggregate information such as the number of times some resource has been shared within that group. To facilitate that, embodiments can update an existing composite view or computer object rather than create a new one. If multiple UEs with differing requirements—as described herein—are to be served from the group shard it is possible to keep one composite view that is continuously updated from the resource and create new ones when necessary.

With regard to the one or more rules, in another example, embodiments can determine how much the resource being shared has changed since the last sharing and locate, in memory, a rule that indicates that if a certain time threshold has been met between the sharing of the resource and/or a content difference threshold indicating actual textual differences between the resource between sharing (e.g., as determined by TF-IDF), then certain types (e.g., external context v. event context) of contextual data, a certain amount of contextual data, or specific contextual data should be presented. For instance, if the difference of the computer resource has changed over a threshold from a first sharing to a second sharing, embodiments can determine that the added members of the group since the second sharing should be listed.

In some embodiments, the contextual data described in block 704 includes external context data that is not part of any message within the computerized group container or communication group. For example, as described herein, the external context can be any data outside of a group communication application, such as information from an email account, social media posts (e.g., via web scraping), text messages or any other suitable external context. Alternatively or additionally, the contextual data can include at least a portion of one or more messages exchanged before or after the sharing gesture within the computerized group container or communication group. For example, as described herein, this can include event context of chat histories leading up to and/or after a sharing gesture. In various embodiments, the contextual data can be any data obtained by the contextual extractor/determiner 254 and/or the context generator 286.

Per block 706, particular embodiments associated the computer object with a group access control level needed to access the computer object. For example, in response to the computer object being generated, certain embodiments can check (e.g., via the group ACL checker 262) whether each group member has access to the computer access. Alternatively, block 706 can include automatically flagging the members of the group as having access and therefore automatically cause presentation per block 707 based on the users already having been logged into the communication group. Additionally or alternatively, embodiments perform block 706 by simply generating or accessing a group ACL so that anytime a corresponding resource is requested, the access credentials of the requesting user can be checked. In some embodiments, block 706 is performed by the group ACL checker 262, the functionality of which is described herein.

In various embodiments, any user that does not meet the group ACL is not a member of the group and is prevented from accessing the computer object. In particular embodiments, "does not meet" means that the user does not have any access credentials that match one or more group ACLs. The reverse is also true such that a user that meets a group ACL has one or more access credentials that match one or more ACLs.

Per block 708, particular embodiments cause presentation of the contextual data and at least the portion (or indication) of the computer resource. For example, referring back to FIG. 4, the contextual presentation with the UI elements 409, 411, 413 are shown and the department A sales information of the computer resource is shown in UI element 415. Additionally, the computer resource name is indicated in the UI element 407. In some embodiments, block 708 is performed by functionality described herein with respect to the presentation component 220 of FIG. 2.

In various embodiments, in response to the extracting of the contextual data and the extracting of at least a portion (or indication) of the computer resource described above, particular embodiments cause presentation, to an app page or web page, of the contextual data and at least the portion of the compute resource. For instance, referring back to FIG. 4, the screenshot 400 may correspond to an app or application page (e.g., instance, dashboard, view, or the like) and the contextual data and portion of a computer reference is displayed as illustrated in FIG. 4. In some embodiments, the app page or web page does not contain a full chat history of messages exchanged within the communication group. For example, this is illustrated in FIGS. 4, 5, and 6 where the respective screenshots only list the computer resources and associated metadata and do not, for example, display or present the chat history associated with the chat button 419 or posts 417.

Some embodiments cause presentation to each computer device associated with each participant (or group member) of the plurality of participants, an indication of the computer object based at least in part on the association of block 706. In particular embodiments, the indication includes the contextual data and at least the portion of the computer resource. For example, the indication can include some of the payload data of the computer object itself, such as the information within the UI elements 409, 411, 413, and 415 of FIG. 4 that is shown based on determining that a user is a member of the communication group.

As described herein, some embodiments determine and compare access credentials of each participant (or group member), of the plurality of participants (or group members), with a resource access control level needed to access the computer resource. Additionally, embodiments determine and compare access credentials of each participant (or group member) with a group access control level needed to access the computer object. For instance, this is described with respect to the functionality of the client-resource runtime evaluator 260 of FIG. 2.

Accordingly, some embodiments determine that access credentials of a first participant (or group member), of the plurality of participants, meets both the resource access control level and the group access control level. And based on the access credentials of the first participant meeting both the resource access control level and the group access control level, certain embodiments present the computer resource and the computer object to a first computing device associated with the first. For example, this concept is described with respect to FIG. 4 where the user has access to the resource and computer object and accordingly is presented with all of the data corresponding to the UI elements 407, 409, 411, 413, and 415.

Some embodiments determine that access credentials of a second participant (or group member) of the plurality of participants (or group members) meets only the group access control level but does not meet the resource access control level. And based on the access credentials of the second participant meeting only the group access control level but not the resource access control level, particular embodiments present only the computer objet to a second computer device associated with the second participant, wherein the computer object only contains the contextual data, and wherein the computer resource is not presented to the second computing device. This concept is illustrated, for example, with respect to FIG. 5 where the user device is presented with the data in UI elements 507, 509, 511, and 513 but is not presented with the actual computer resource.

Particular embodiments determine that access credentials of a user meet only a resource access control level needed to access the computer resource but does not meet the group access control level. And based on the access credentials of the user meeting only the resource access control level but not the group access control level, embodiments present only the computer resource to a computing device of the user and do not present the computer object to the computing device of the user. This concept is illustrated, for example, with respect to FIG. 6 where only the computer resource itself is provided in the UI element 607 but no other contextual data is provided.

Figure 8:
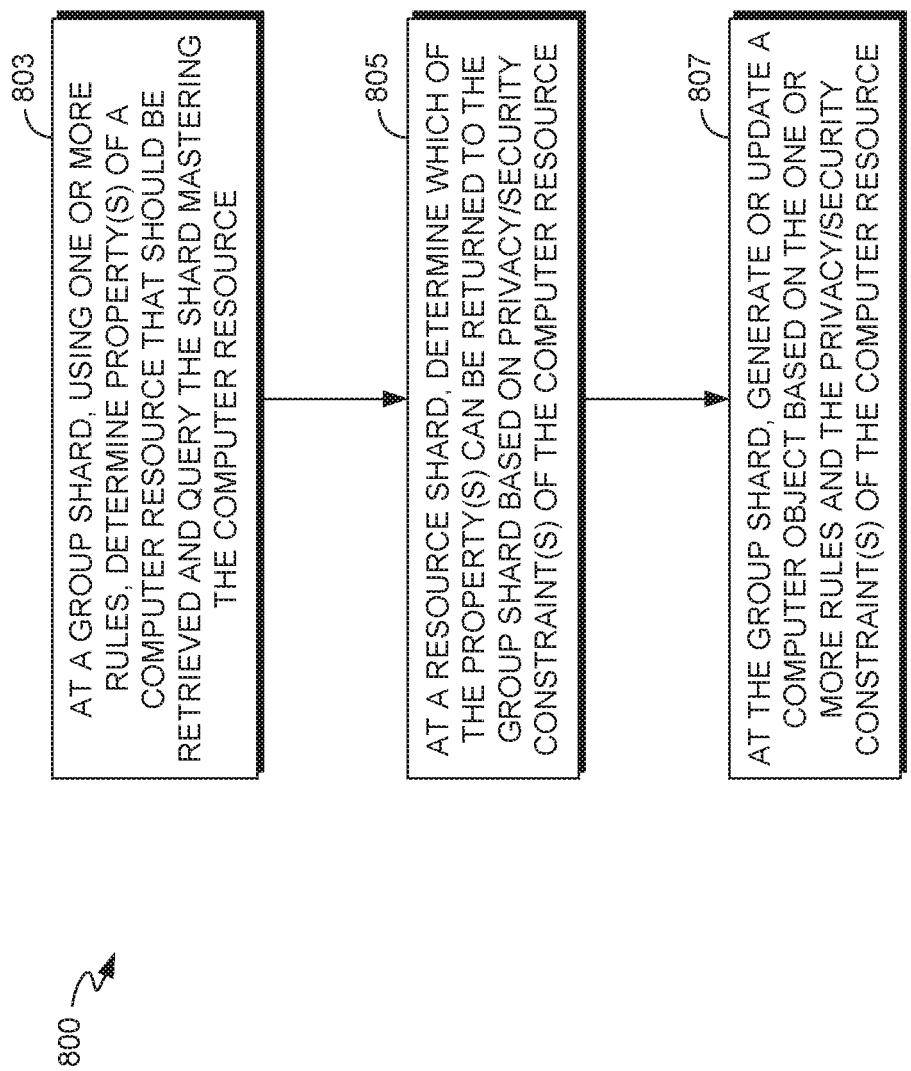
FIG. 8 is a flow diagram of an example process for generating or updating a computer object, in accordance with embodiments of the presents disclosure.

FIG. 8 is a flow diagram of an example process for generating or updating a computer object, according to some embodiments. In some embodiments, one or more blocks of FIG. 8 are included among or represent one or more blocks in the process 700 of FIG. 7. For example, blocks 803 and 805 of FIG. 8 can occur before block 704 of FIG. 7 (but prior to block 702 of FIG. 7). Likewise, in some embodiments, block 807 represents or includes the functionality as described with respect to block 704 of FIG. 7.

FIG. 8 describes creating or updating privacy preserving composite views or computer objects as a result of a sharing gesture (e.g., block 702 of FIG. 7). Per block 803, at a group shard (e.g., a communication group or communication group channel), using one or more rules, particular embodiments determine property(s) of a computer resource that should be retrieved and query the particular shard mastering (or controlling access to) the shared resource for the property(s). In some embodiments, the one or more rules are the same as the one or more rules described above with respect to block 704 and/or the object instantiation component 288 of FIG. 2. In some embodiments, the functionality described herein with respect to the object instantiation component 288 is the component that performs block 803.

Per block 805, at a resource shard (e.g., a process or application that controls access to the computer resource), embodiments determine whether of the property(s) can be returned to the group shard based on privacy/security constraint(s) of the computer resource. In some embodiments, the functionality described with respect to the resource ACL checker 261 performs block 805. When receiving a query for a set of properties and based on the privacy/security constraints pertaining to the computer resource, embodiments determine properties of the computer resource that can be copied over to the group shard. Particular embodiments create an intersection (e.g., via the Jaccard index) between the sets of properties being queried for, and the properties that can be returned subject to privacy/security constraints. Then particular embodiments return a results of the intersection to the group shard. Only those properties (if any properties at all) that a user has access to should be returned.

In an illustrative example of block 805, in response to receiving or detecting a sharing gesture, embodiments can determine the access credentials of each member or participant on a communication group and compare them with one or more resource ACLs needed to access the computer resource (or properties of the computer resource) and then return only those properties to the group shard (or specific user device) that the group (or user in the group) has access to. For example, referring back to FIG. 4, even though, for example, in a sharing gesture a user may have tried to share the entire EXCEL document correspond to UI element 407, some embodiments only show or provide access to the department A sales data, as illustrated in the UI element 415. In this way, each user of a group can be presented with different views or computer objects representing a computer resource depending on the exact properties they have access to. Alternatively, embodiments can present the same view or object to members of the group based on one or more rules such as only presenting properties that everyone has access to in case multiple people within the group have differing access credentials and differing properties that can be returned.

Per block 807, at the group shard, some embodiments generate or update a computer object based on the one or more rules and the privacy/security constraint(s) of the computer resource. In some embodiments, this is performed by the functionality as described herein with respect to the composite view object generator 280. Based on the one or more rules from the group shard, embodiments determine which composite views or computer objects should be updated and update these with relevant information (e.g., contextual data) from the group shard and that returned for the computer resource and then associate the group ACL with the composite view. For example, as described herein, the contents of a computer resource or contextual data may have changed over a threshold between two different sharing gestures. In these embodiments, embodiments update the computer object (which has already been created) with new contextual data or new payload computer resource data.

Particular embodiments additionally or alternatively determine which composite views should be instantiated and created. Embodiments populate these composite views with relevant information (e.g., contextual data) from the group shard and that returned for the computer resource and associated the group ACL with the composite view. For instance, perhaps a computer object has not been created yet because a particular resource has never been shared among the communication group. In these instances, embodiments generate and populate a computer object with contextual data and/or one or more portions of the computer resource itself.

Figure 9:
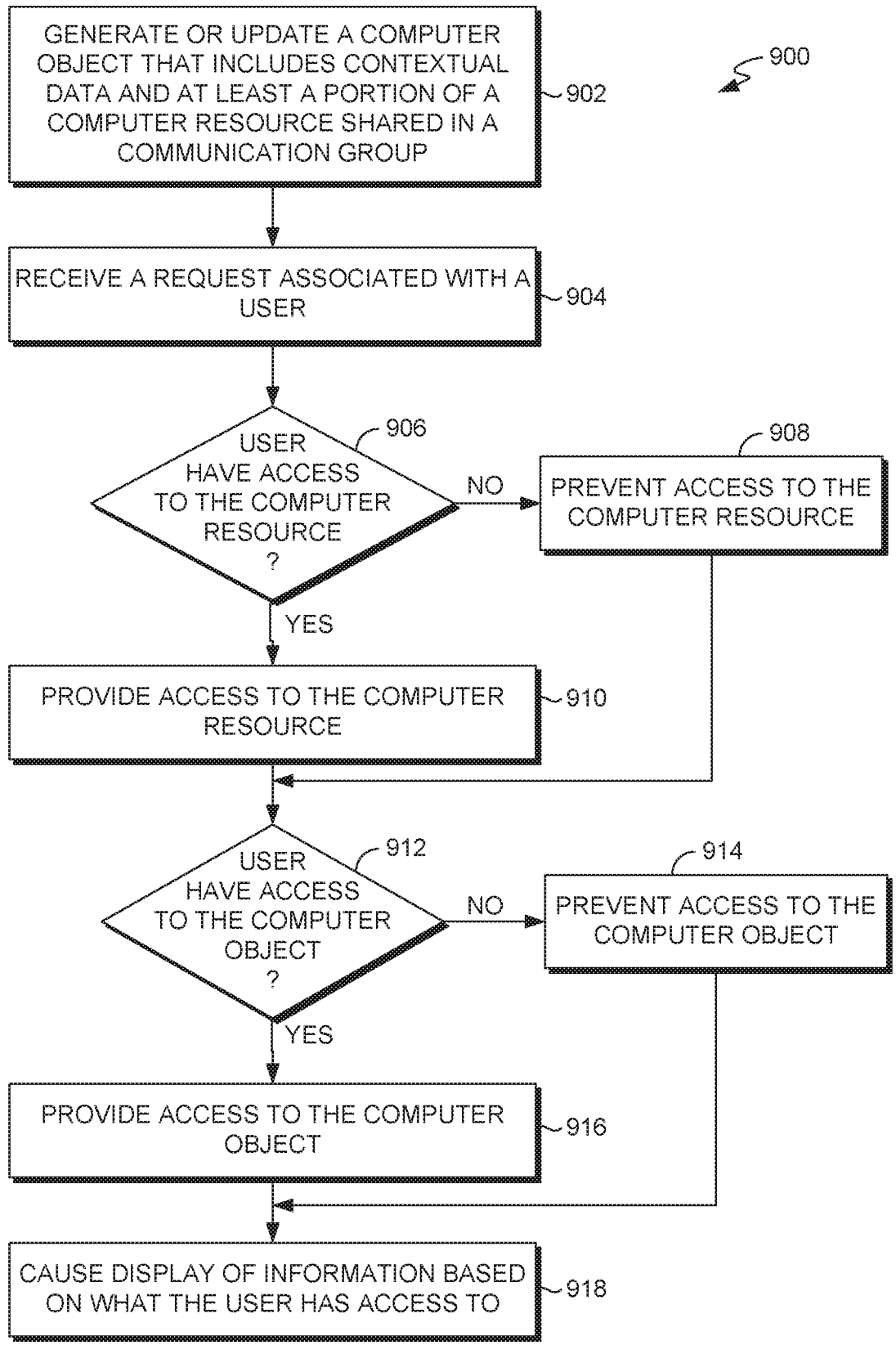
FIG. 9 is a flow diagram of an example process for causing display of information based on whether the user has access to a computer object and an associated resource, in accordance with embodiments of the present disclosure.

FIG. 9 is a flow diagram of an example process 900 for causing display of information based on whether the user has access to a computer object and an associated resource, according to some embodiments. In some embodiments, process 900 represents or includes the functionality as described herein with respect to the client-resource runtime evaluator 260 of FIG. It is understood that the process 900 may include or remove one or more blocks. For example, in some embodiments, blocks 906, 908 are not present.

Per block 902, a computer object is generated or update where the computer object includes contextual data and at least a portion of a computer resource shared in a communication group. For example, this can be the computer resource described with respect to the composite view object generator 280. Additionally or alternatively, block 902 can represent or include the functionality as described with respect to block 704 or block 807.

Per block 904, a request associated with a user is received. For example, a user may directly request the computer resource after a chat session or sharing gesture. Alternatively or additionally, the user may switch or otherwise be directed to application pages, views, web pages, and the like that would typically cause the computer resource or an indication of the computer object to be displayed. In these embodiments, the act of switching or being directed to (e.g., via a URL query) such page, view, or web page causes the request to be received. In another example, the act of the user trying to join the communication group or otherwise access group information can automatically trigger the request that is received.

Per block 906, it is determined whether the user has access to the computer resource (or one or more properties of the resource). For example, referring back to FIG. 1, the resource ACL checker 262 can compare the user's access credentials with one or more resource ACLs needed to access the resource.

Per block 908, if the user does not have access to the computer resource (or the one or more properties), particular embodiments prevent access to the computer resource (or the one or more properties). That is, the user device of the user will not be able to read, retrieve, or otherwise modify the computer resource. Per block 910, if the user has access to the computer resource (or the one or more properties), embodiments provides access to the computer resource (or one or more properties). That is the user device of the user will be able to read, retrieve, or otherwise modify the computer resource.

Per block 912, it is determined whether the user has access to the computer object. For example, referring back to FIG. 2, this may be performed by the functionality as described with respect to the group ACL checker 262. For instance, this determination can be based at least in part on comparing the user's access credentials to one or more access control levels needed to access the computer object.

Per block 914, if the user does not have access to the computer object, embodiments prevent access to the computer object. That is the user device of the user will not be able to read, retrieve, or otherwise modify the computer object. Per block 916, if the user has access to the computer object, embodiments provide access to the computer object. That is the user device of the user will be able to read, retrieve, or otherwise modify the computer object.

Per block 918, particular embodiments (e.g., the presentation component 220) cause display of information based on what the user has access to. For example, based at least in part on whether the user has access to the computer object, some embodiments cause display, to a user device of the user, an indication of the computer object or they do not cause display of the indication of the computer object. An example of block 918 is each screenshot 400, 500, and 600 of respective FIGS. 4, 5, and 6 that can be provided based on what exact information (e.g., exact resource properties) and contextual data the user has access to.

Figure 10:
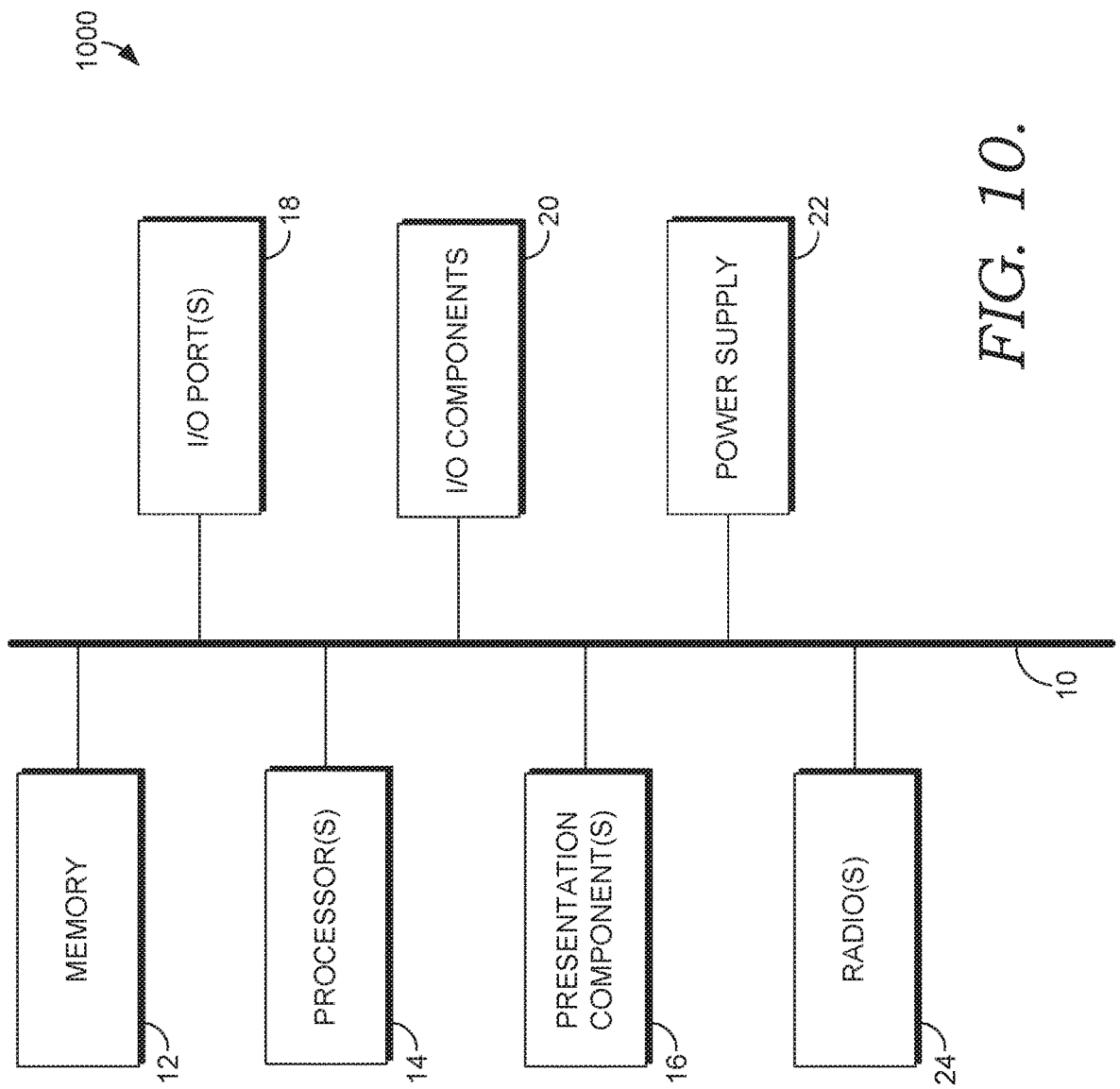
FIG. 10 is a block diagram of an exemplary computing device for use in implementing embodiments of the present disclosure.

Having described various implementations, an exemplary computing environment suitable for implementing embodiments of the disclosure is now described. With reference to FIG. 10, an exemplary computing device is provided and referred to generally as computing device 1000. The computing device 1000 is but one example of a suitable computing environment and is not intended to suggest any limitation as to the scope of use or functionality of embodiments of the disclosure. Neither should the computing device 1000 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 10, computing device 1000 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and with reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors 14 that read data from various entities such as memory 12 or I/O components 20. Presentation component(s) 16 presents data indications to a user or other device. In some implementations presentation component 220 of system 200 may be embodied as a presentation component 16. Other examples of presentation components may include a display device, speaker, printing component, vibrating component, and the like.

The I/O ports 18 allow computing device 1000 to be logically coupled to other devices, including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Some embodiments of computing device 1000 may include one or more radio(s) 24 (or similar wireless communication components). The radio 24 transmits and receives radio or wireless communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A computerized system comprising: one or more processors; and computer storage memory having computer-executable instructions stored thereon which, when executed by the one or more processors, implement a method comprising: detecting a sharing gesture that includes a reference to a computer resource, wherein the sharing gesture is included in a message sent by a participant within a computerized group container, and wherein the computerized group container is configured to store one or more electronic messages exchanged between a plurality of participants of a group; based at least in part on the sharing gesture and one or more attributes of the group, generating a computer object that includes: contextual data associated with the computer resource and at least an indication of the computer resource; associating the computer object with a group access control level utilized for accessing the computer object, wherein a first user that does not meet the group access control level is not a member of the group and the computer object is not accessible to the first user; and based at least in part on the association, causing to be presented, to one or more computing devices associated with one or more participants of the plurality of participants, an indication of the computer object, the indication of the computer object including the contextual data and at least the indication of the computer resource.

Clause 2. The system of clause 1, the method further comprising comparing access credentials of each participant, of the plurality of participants, with a resource access control level needed to access the computer resource.

Clause 3. The system of clause 2, the method further comprising: determining that access credentials of a first participant, of the plurality of participants, meets both the resource access control level and the group access control level; and based on the access credentials of the first participant meeting both the resource access control level and the group access control level, causing presentation of the computer resource and the computer object to a first computing device associated with the first participant.

Clause 4. The system of clause 3, the method further comprising: determining that access credentials of a second participant, of the plurality of participants, meets only the group access control level but not the resource access control level; and based on the access credentials of the second participant meeting only the group access control level but not the resource access control level, causing presentation of the computer object to a second computing device associated with the second participant, wherein the computer object contains a portion of the computer resource and the contextual data, and wherein an entirety of the computer resource is not caused to be presented to the second computing device;

Clause 5. The system of clause 1, the method further comprising: determining that access credentials of a second user meets only a resource access control level needed to access the computer resource but does not meet the group access control level; and based on the access credentials of the second user meeting only the resource access control level but not the group access control level, causing presentation of only the computer resource to the user and not presenting the computer object to a computing device of the second user.

Clause 6. The system of clause 1, wherein the contextual data includes external contextual data that is not a part of any message within the computerized group container.

Clause 7. The system of clause 1, wherein the contextual data includes at least a portion of one or more messages exchanged before or after the sharing gesture within the computerized group container.

Clause 8. The system of clause 1, wherein the reference is at least one reference of a group of references consisting of: a URL link or hyperlink to a web resource, a link to a document or file, and a natural language description of the computer resource.

Clause 9. The system of clause 1, wherein the generating of the computer object is based at least in part on a group type of the group and a computer resource type of the computer resource.

Clause 10. A computer-implemented method comprising: generating or updating a computer object that includes at least a portion or indication of a computer resource shared in a communication group; receiving a request associated with the computer object and a user; determining whether the user has access to the computer object based at least in part on comparing access credentials of the user to one or more group access control levels utilized for accessing the computer object; and based at least in part on whether the user has access to the computer object: if the user has access to the computer object, causing display, to a user device of the user, an indication of the computer object; and if the user does not have access to the computer object, not causing display of the indication of the computer object.

Clause 11. The method of clause 10, further comprising comparing access credentials of the user with a resource access control level needed to access the computer resource.

Clause 12. The method of clause 11, further comprising: determining that the access credentials of the user meets both the resource access control level and the one or more group access control levels; and based on the access credentials of the user meeting both the resource access control level and the one or more group access control levels, causing presentation of the computer resource and the computer object to the user device associated with the user.

Clause 13. The method of clause 11, further comprising: determining that the access credentials of the user meets only the one or more group access control levels but not the resource access control level; and based on the access credentials of the user meeting only the one or more group access control levels but not the resource access control level, causing presentation of the computer object to the user device associated with the user.

Clause 14. The method of clause 11, further comprising: determining that the access credentials of the user meets only the resource access control level needed to access the computer resource but does not meet the one or more group access control levels; and based on the access credentials of the second user meeting only the resource access control level but not the one or more group access control level, causing presentation of only the computer resource to the user device and not causing presentation of the computer object to the user device.

Clause 15. The method of clause 10, wherein the computer object includes contextual data, and wherein the contextual data includes external contextual data that is not a part of any message within the communication group.

Clause 16. The method of clause 10, wherein the computer object includes contextual data, and wherein the contextual data includes at least a portion of one or more messages exchanged before or after the sharing gesture within the computerized group container.

Clause 17. The method of clause 10, further comprising: determining that the user has access to the computer object; and based on the user having access to the computer object, causing display, to the user device of the user, the indication of the computer object.

Clause 18. The method of clause 10, further comprising: determining that the user does not have access to the computer object; and based on the user not having access to the computer object, selectively refraining from causing display, to the user device of the user, the indication of the computer object.

Clause 19. One or more computer storage media having computer-executable instructions embodied thereon that, when executed, by one or more processors, cause the one or more processors to perform a method, the method comprising: detecting a sharing gesture that includes a reference to a computer resource, wherein the sharing gesture is included in a message sent by a participant within a communication group that includes a plurality of participants; based at least in part on the sharing gesture, determining one or more rules to apply that indicate what contextual data associated with the computer resource to extract or indicate how much of a computer resource to extract; based at least in part on the one or more rules, extracting the contextual data associated with the computer resource and extracting at least a portion of the computer resource; and in response to the extracting of the contextual data and the extracting of at least the portion, causing presentation, to an app page or web page, the contextual data and at least the portion of the computer resource.

Clause 20. The computer storage media of clause 19, wherein the app page or web page does not contain a full chat history of messages exchanged within the communication group, and wherein the contextual data includes external context or event context.

What is claimed is:

1. A system comprising:
one or more processors; and
computer storage memory having computer-executable instructions stored thereon which, when executed by the one or more processors, implement a method comprising:
detecting a sharing gesture that includes a reference to a computer resource, wherein the sharing gesture is included in a message sent by a sharing participant within a computerized group container, and wherein the computerized group container is configured to store one or more electronic messages exchanged between a plurality of participants of a group;
based at least in part on the sharing gesture and one or more attributes of the group, generating a computer object that supports selectively presenting information associated with the computer resource within the computerized group container, the computer object including contextual data associated with the sharing gesture and at least an indication of the computer resource referenced in the sharing gesture;
associating the computer object with a group access control level utilized to control accessing the computer object, the group access control level being different from a resource access control level controlling access to the computer resource indicated by the computer object;
determining, based on an assessment of access credentials, that a first participant of the plurality of participants of the group is permitted to access the computer object that includes the indication of the computer resource but is not permitted access to the computer resource; and presenting, to a user device of the first participant, aspects of the computer object including the contextual data associated with the computer resource and the indication of the computer resource without presenting the computer resource.

2. The system of claim 1, wherein the contextual data includes at least one of a file name of the computer resource and a URL where the computer resource can be located.

3. The system of claim 1, the method further comprising:
determining that the access credentials of the first participant, of the plurality of participants, meet both the resource access control level and the group access control level; and
based on the access credentials of the first participant meeting both the resource access control level and the group access control level, causing presentation of the computer resource and the computer object to the user device of the first participant.

4. The system of claim 1,
wherein presenting the aspects of the computer object further comprises presenting at least one of a timestamp indicating when the sharing gesture occurred and a portion of the computer resource.

5. The system of claim 1, the method further comprising:
determining that access credentials of a second user meet only the resource access control level needed to access the computer resource but does not meet the group access control level; and
based on the access credentials of the second user meeting only the resource access control level but not the group access control level, causing presentation of the computer resource and not causing presentation of the computer object to a computing device of the second user.

6. The system of claim 1, wherein presenting the aspects of the computer object further comprises presenting external contextual data that is not a part of any message within the computerized group container.

7. The system of claim 1, wherein presenting the aspects of the computer object further comprises presenting at least a portion of one or more messages exchanged before the sharing gesture within the computerized group container.

8. The system of claim 1, wherein the reference is at least one reference of a group of references consisting of: a URL link or hyperlink to a web resource, a link to a document or file, and a natural language description of the computer resource.

9. The system of claim 1, wherein the generating of the computer object is based at least in part on a group type of the group and a computer resource type of the computer resource.

10. A method comprising:
generating or updating a computer object in response to sharing of a computer resource within in a communication group, the computer object including contextual data associated with computer resource and a portion or indication of the computer resource;
receiving a request associated with the computer object and a user;
determining whether the user has access to the computer object based at least in part on comparing access credentials of the user to one or more group access control levels utilized to control accessing the computer object;
determining whether the user has access to the computer resource based at least in part on comparing the access credentials of the user to a resource access control level controlling access to the computer resource;
based on an assessment of the access credentials of the user, granting the user access to the computer object that includes the portion or indication of the computer resource while denying the user access to the computer resource; and
presenting, on a user device of the user, aspects of the computer object including contextual data associated with the computer resource and the indication of the computer resource without presenting the computer resource.

11. The method of claim 10, wherein the contextual data includes at least one of a file name of the computer resource and a URL where the computer resource can be located.

12. The method of claim 10, further comprising:
determining that access credentials of a second user meet both the resource access control level and the one or more group access control levels; and
based on the access credentials of the second user meeting both the resource access control level and the one or more group access control levels, causing presentation of the computer resource and the computer object to a second user device associated with the second user.

13. The method of claim 10, wherein presenting the aspects of the computer object further comprises presenting at least one of a timestamp indicating when the computer resource was shared or the portion of the computer resource.

14. The method of claim 10, further comprising:
determining that access credentials of a second user meet only the resource access control level needed to access the computer resource but do not meet the one or more group access control levels; and
based on the access credentials of the second user meeting only the resource access control level but not the one or more group access control level, causing presentation of only the computer resource to a second user device of the second user and not causing presentation of the computer object to the second user device.

15. The method of claim 10, wherein the contextual data includes external contextual data that is not a part of any message within the communication group.

16. The method of claim 10, wherein the computer resource is shared based on a sharing gesture that includes a reference to the computer resource, wherein the sharing gesture is included in a message sent by a sharing participant within a computerized group container, wherein the computer object includes contextual data, and wherein the contextual data includes at least a portion of one or more messages exchanged before or after the sharing gesture within the computerized group container.

17. The method of claim 10, further comprising:
determining that the user has access to the computer object; and
based on the user having access to the computer object, causing display, to the user device of the user, the indication of the computer object.

18. The method of claim 10, further comprising:
determining that the user does not have access to the computer object; and
based on the user not having access to the computer object, selectively refraining from causing display, to the user device of the user, the indication of the computer object.

19. One or more non-transitory computer storage media having computer-executable instructions embodied thereon that, when executed, by one or more processors, cause the one or more processors to perform a method, the method comprising:

detecting a sharing gesture that includes a reference to a computer resource, wherein the sharing gesture is included in a message sent by a sharing participant within a communication group that includes a plurality of participants;

based at least in part on the sharing gesture, generating a computer object that includes contextual data associated with the sharing gesture and at least an indication of the computer resource referenced in the sharing gesture;

associating the computer object with a group access control level utilized to control accessing the computer object, the group access control level being different from a resource access control level controlling access to the computer resource indicated by the computer object;

determining, based on an assessment of access credentials, that a first participant of the plurality of participants of the group is permitted to access the computer object that includes the indication of the computer resource and further determining that the first participant is not permitted access to the computer resource; and presenting, to a user device of the first participant, information of the computer object including the contextual data associated with the computer resource and the indication of the computer resource without presenting the computer resource.

20. The computer storage media of claim 19, wherein the presentation is caused to be presented within an app page or web page that does not contain a full chat history of messages exchanged within the communication group, and wherein the contextual data includes external context or event context.

\* \* \* \* \*